United States Patent
Li et al.

(10) Patent No.: US 9,258,798 B2
(45) Date of Patent: Feb. 9, 2016

(54) APPARATUS AND METHOD FOR PAGING IN COMMUNICATION SYSTEMS WITH LARGE NUMBER OF ANTENNAS

(71) Applicant: Samsung Electronics Co., LTD, Suwon-si, Gyeonggi-do (KR)

(72) Inventors: Ying Li, Richardson, TX (US); Kaushik Josiam, Dallas, TX (US); Rakesh Taori, McKinney, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 106 days.

(21) Appl. No.: 14/037,200

(22) Filed: Sep. 25, 2013

(65) Prior Publication Data
US 2014/0128109 A1    May 8, 2014

Related U.S. Application Data

(60) Provisional application No. 61/722,598, filed on Nov. 5, 2012.

(51) Int. Cl.
| | | |
|---|---|---|
| H04W 68/00 | (2009.01) | |
| H04W 4/00 | (2009.01) | |
| H04W 74/00 | (2009.01) | |
| H04B 17/02 | (2006.01) | |
| H04W 68/02 | (2009.01) | |
| H04W 16/28 | (2009.01) | |

(52) U.S. Cl.
CPC .............. *H04W 68/02* (2013.01); *H04W 16/28* (2013.01)

(58) Field of Classification Search
CPC . H04B 7/18567; H04B 7/0408; H04W 68/00; H04W 68/02

USPC ........ 455/422.1, 455, 458, 133–135; 370/334
See application file for complete search history.

(56) References Cited

U.S. PATENT DOCUMENTS

| | | | | |
|---|---|---|---|---|
| 5,905,443 A | * | 5/1999 | Olds et al. ..................... 340/7.27 |
| 6,131,031 A | | 10/2000 | Lober et al. | |
| 2004/0233888 A1 | | 11/2004 | Bonta et al. | |
| 2005/0261028 A1 | * | 11/2005 | Chitrapu ..................... 455/562.1 |
| 2006/0203711 A1 | | 9/2006 | Oh et al. | |
| 2007/0195736 A1 | * | 8/2007 | Taira et al. ..................... 370/335 |
| 2009/0232240 A1 | | 9/2009 | Lakkis | |

(Continued)

FOREIGN PATENT DOCUMENTS

WO    WO 2012/135275 A2    10/2012

OTHER PUBLICATIONS

International Search Report dated Mar. 13, 2014 in connection with International Patent Application No. PCT/KR2013/009961, 4 pages.
Written Opinion of International Searching Authority dated Mar. 13, 2014 in connection with International Patent Application No. PCT/KR2013/009961, 6 pages.

(Continued)

*Primary Examiner* — Dung Hong

(57) ABSTRACT

A mobile station performs a method for paging configuration in a wireless network. The method includes transmitting, to a base station, a parameter M representing a number of receiving (RX) beam instances at the mobile station in idle mode for the mobile station to finish one round of beam steering. The method also includes determining a timing for receiving a paging message from the base station, the timing being a function of the parameter M, the paging message comprising a mobile station identifier. The method further includes receiving the paging message from the base station based on the determined timing.

20 Claims, 25 Drawing Sheets

(56) References Cited

U.S. PATENT DOCUMENTS

2010/0061286 A1   3/2010   Ji et al.
2010/0290550 A1   11/2010  Rietman et al.
2010/0323610 A1*  12/2010  Li et al. .................. 455/3.01

OTHER PUBLICATIONS

Translated Office Action dated Dec. 17, 2013 in connection with Korean Patent Application 10-2007-0106319; 8 pages.

* cited by examiner

Architecture 2. Subarray of array. Each subarray has Nf antennas. Each subarray is corresponding to one of Nd digital chains. Total number of antennas is Nt=Nf*Nd Control beams B1,B2,B3,B4 carry same information Control beams B1,B2,B3,B4 carry different information
E.g., each control beam only carries the information related to the data beams within its coverage Beam: e.g., for data control channel beam: e.g., Unicast Data beam Example 1

RX beam
instances:
M=4

One RF chain.
RX1,2,3,4 are formed by steering.

Example 2

RX beam
instances:
M=2

Two RF chains
RX 1,2 are formed on RF chain 1 by steering,
RX 3,4 are formed on RF chain 2 by steering.
Two concurrent RX beams can be formed by
having one RX beam from each of the two
chains.

Example 1

TX beam
instances:
N=4

One RF chain.
TX1,2,3,4 are formed by steering.

Example 2

TX beam
instances:
N=2

Two RF chains.
TX1,2 are formed on RF chain 1 by steering.
TX 3,4 are formed on RF chain 2 by steering.
Two concurrent TX beams can be formed by
having one TX beam from each of the two chains.
It takes 2 TX beam instances to finish one round of
TX beam steering.

APPARATUS AND METHOD FOR PAGING IN COMMUNICATION SYSTEMS WITH LARGE NUMBER OF ANTENNAS

CROSS-REFERENCE TO RELATED APPLICATION(S) AND CLAIM OF PRIORITY

The present application claims priority to U.S. Provisional Patent Application Ser. No. 61/722,598, filed Nov. 5, 2012, entitled "PAGING IN COMMUNICATION SYSTEMS WITH LARGE NUMBER OF ANTENNAS". The content of the above-identified patent document is incorporated herein by reference.

TECHNICAL FIELD

The present application relates generally to wireless communication and, more specifically, to an apparatus and method for paging in communication systems with large number of antennas.

BACKGROUND

Wireless communication has been one of the most successful innovations in modern history. Recently, the number of subscribers to wireless communication services exceeded five billion and continues to grow quickly. The demand of wireless data traffic is rapidly increasing due to growing popularity among consumers and businesses of smart phones and other mobile data devices, such as tablets, "note pad" computers, net books, and eBook readers. In order to meet the high growth in mobile data traffic, improvements in radio interface efficiency and allocation of new spectrum is of paramount importance.

SUMMARY

A method for paging configuration by a mobile station in a wireless network is provided. The method includes transmitting, to a base station, a parameter M representing a number of receiving (RX) beam instances at the mobile station in idle mode for the mobile station to finish one round of beam steering. The method also includes determining a timing for receiving a paging message from the base station, the timing being a function of the parameter M, the paging message comprising a mobile station identifier. The method further includes receiving the paging message from the base station based on the determined timing.

An apparatus for use in a mobile station configured to receive paging messages in a wireless network is provided. The apparatus includes at least one antenna and a processor coupled to the at least one antenna. The processor is configured to transmit, to a base station, a parameter M representing a number of receiving (RX) beam instances at the mobile station in idle mode for the mobile station to finish one round of beam steering. The processor is also configured to determine a timing for receiving a paging message from the base station, the timing being a function of the parameter M, the paging message comprising a mobile station identifier. The processor is further configured to receive the paging message from the base station based on the determined timing.

A method for paging configuration by a base station in a wireless network is provided. The method includes receiving, from a mobile station, a parameter M representing a number of receiving (RX) beam instances at the mobile station in idle mode for the mobile station to finish one round of beam steering. The method also includes determining a timing for transmitting a paging message to the mobile station, the timing being a function of the parameter M, the paging message comprising a mobile station identifier. The method further includes transmitting the paging message to the mobile station based on the determined timing.

An apparatus for use in a base station configured to transmit paging messages in a wireless network is provided. The apparatus includes at least one antenna and a processor coupled to the at least one antenna. The processor is configured to receive, from a mobile station, a parameter M representing a number of receiving (RX) beam instances at the mobile station in idle mode for the mobile station to finish one round of beam steering. The processor is also configured to determine a timing for transmitting a paging message to the mobile station, the timing being a function of the parameter M, the paging message comprising a mobile station identifier. The processor is further configured to transmit the paging message to the mobile station based on the determined timing.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
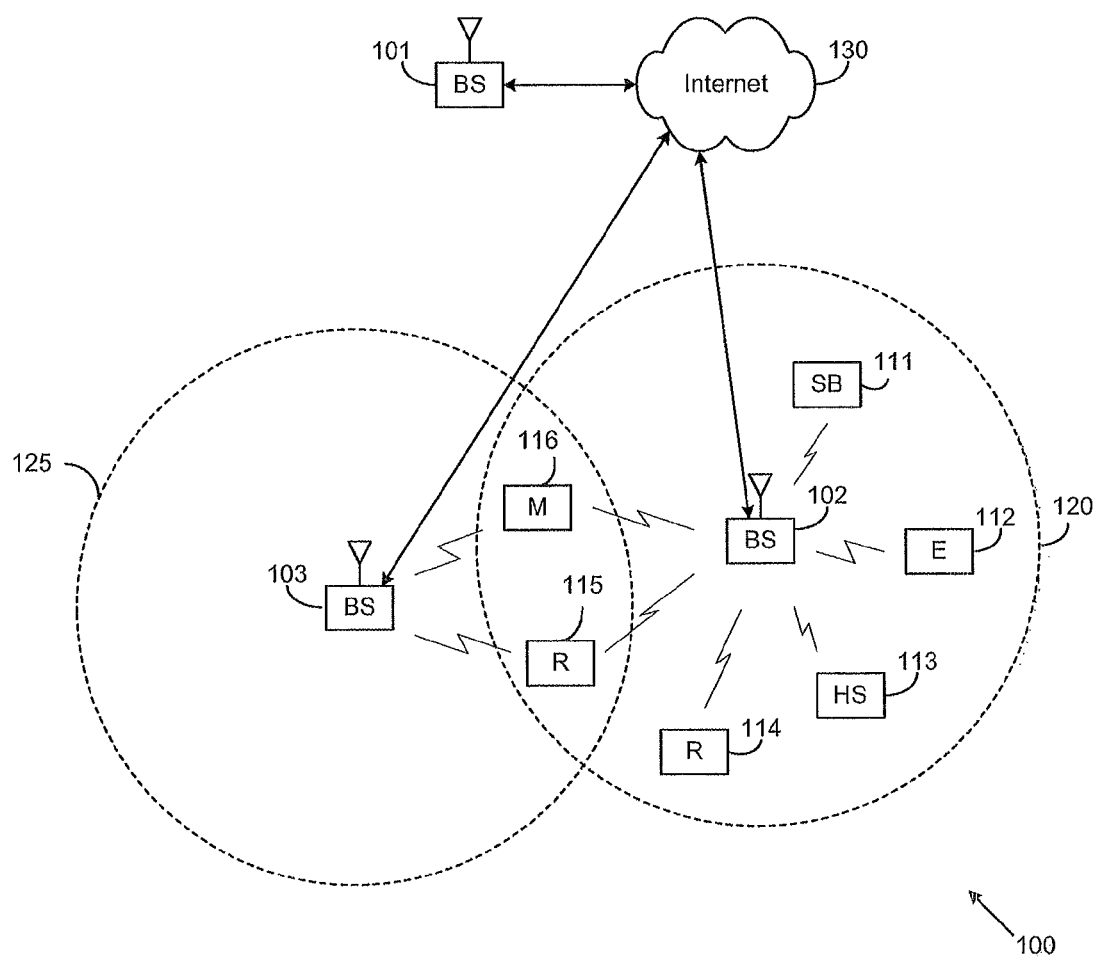
FIG. 1 illustrates a wireless communication network, according to embodiments of this disclosure.

FIGS. 1 through 19D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: (i) F. Khan and Z. Pi, "MmWave Mobile Broadband (MMB): Unleashing The 3-300 GHz Spectrum", in Proc. Sarnoff Symposium, 2011 (hereinafter "REF1"); Z. Pi and F. Khan, "An Introduction To Millimeter-Wave Mobile Broadband Systems", IEEE Communication Magazine, June 2011 (hereinafter "REF2"); and Z. Pi and F. Khan, "System Design And Network Architecture For A Millimeter-Wave Mobile Broadband (MMB) System", in Proc. Sarnoff Symposium, 2011 (hereinafter "REF3").

In order to meet the high growth in mobile data traffic, improvements in radio interface efficiency are important. One important approach is to use a large number of antennas. In many cellular systems, the receiver is omnidirectional. When a receiving device returns from a discontinuous receive (DRX) mode (e.g., wakes up from the idle mode to monitor a paging message), it can utilize its omnidirectional receiver to receive the signal from the node (e.g., a base station) that is transmitting. However, for systems with a large number of antennas, directional beams can be formed for communications. In systems that utilize directional beams, if a device uses a previously-used receive direction to receive a signal from base station, the receiver may not receive the signal. For example, the receiving (RX) pattern used right before idle mode may no longer be useful. Thus, a device that uses multiple RX beams may need to determine which RX beam pattern to use when the device comes back from the idle mode. Accordingly, the question is how to support paging in communication systems with large number of antennas.

This disclosure describes methods and apparatus for paging in communication systems with a large number of antennas. Although embodiments of this disclosure are described in the context of communication with millimeter waves, the disclosed embodiments are also applicable in other communication mediums, e.g., radio waves with frequency of 3 GHz-30 GHz that exhibit properties similar to millimeter waves. In some cases, the disclosed embodiments are also applicable to electromagnetic waves with terahertz frequencies, infrared, visible light, and other optical media. For illustrative purposes, the terms "cellular band" and "millimeter wave band" are used herein, where "cellular band" refers to frequencies of approximately a few hundred megahertz to a few gigahertz, and "millimeter wave band" refers to frequencies of approximately a few tens of gigahertz to a few hundred gigahertz. One difference between the two is that the radio waves in cellular bands have less propagation loss and can provide superior coverage, but may require large antennas. On the other hand, radio waves in millimeter wave bands usually exhibit higher propagation loss but lend themselves well to high-gain antennas or antenna array designs in a small form factor.

The embodiments disclosed herein primarily describe communication between base stations and mobile stations (e.g., base station to mobile station transmission). Those skilled in the art will recognize that the disclosed embodiments are also applicable for communications between base stations (e.g., base station to base station transmission), and for communications between mobile stations (e.g., mobile station to mobile station communication). The embodiments disclosed herein are applicable for communication systems with large number of antennas, such as systems in MMB, RF band, and the like.

FIG. 1 illustrates a wireless communication network, according to an embodiment of this disclosure. The embodiment of wireless communication network 100 illustrated in FIG. 1 is for illustration only. Other embodiments of the wireless communication network 100 could be used without departing from the scope of this disclosure.

In the illustrated embodiment, the wireless communication network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of subscriber stations (also referred to herein as mobile stations) within coverage area 120 of base station 102. Throughout this disclosure, the term mobile station (MS) is interchangeable with the term subscriber station. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Each base station 101-103 can have a globally unique base station identifier (BSID). A BSID is often a MAC (media access control) ID. Each base station 101-103 can have multiple cells (e.g., one sector can be one cell), each with a physical cell identifier, or a preamble sequence, which is often carried in the synchronization channel.

While only six subscriber stations are depicted in FIG. 1, it is understood that the wireless communication network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. For example, subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
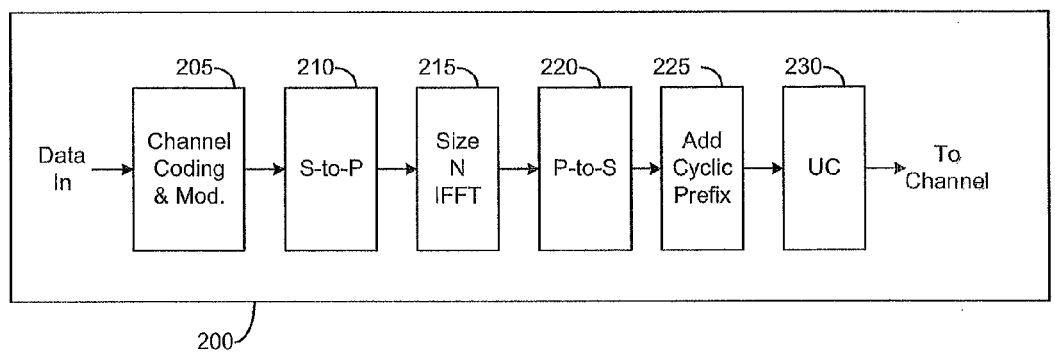
FIG. 2A is a high-level diagram of an orthogonal frequency division multiple access (OFDMA) or millimeter wave transmit path, according to embodiments of this disclosure.
Figure 2B:
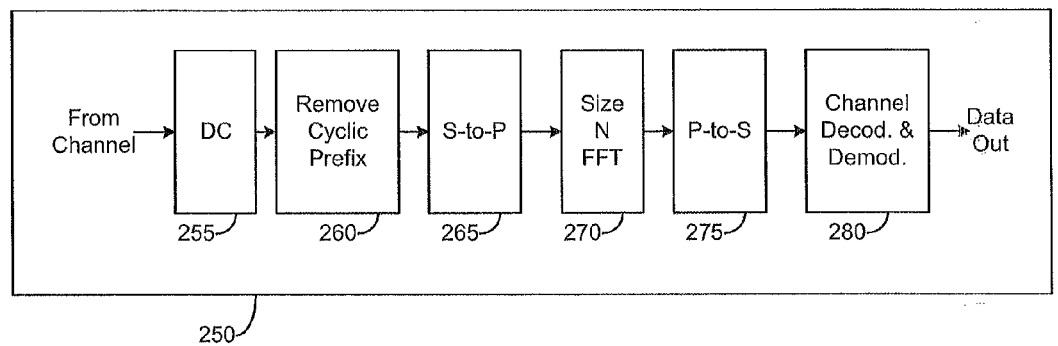
FIG. 2B is a high-level diagram of an OFDMA or millimeter wave receive path, according to embodiments of this disclosure.

FIG. 2A is a high-level diagram of an orthogonal frequency division multiple access (OFDMA) or millimeter wave transmit path, according to embodiments of this disclosure. FIG. 2B is a high-level diagram of an OFDMA or millimeter wave receive path, according to embodiments of this disclosure. In FIGS. 2A and 2B, the transmit path 200 may be implemented, e.g., in base station (BS) 102 and the receive path 250 may be implemented, e.g., in a subscriber station, such as subscriber station 116 of FIG. 1. It will be understood, however, that the receive path 250 could be implemented in a base station (e.g. base station 102 of FIG. 1) and the transmit path 200 could be implemented in a subscriber station. All or part of the transmit path 200 and the receive path 250 may comprise, or be comprised of, one or more processors.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive, path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

In an embodiment of this disclosure, a base station (BS) can have one or multiple cells, and each cell can have one or multiple antenna arrays, where each array within a cell can have different frame structures, e.g., different uplink and downlink ratios in a time division duplex (TDD) system. Multiple TX/RX (transmitting/receiving) chains can be applied in one array, or in one cell. One or multiple antenna arrays in a cell can have the same downlink control channel (e.g., synchronization channel, physical broadcast channel, and the like) transmission, while the other channels (e.g., data channel) can be transmitted in the frame structure specific to each antenna array.

The base station can use one or more antennas or antenna arrays to carry out beam forming. Antenna arrays can form beams having different widths (e.g., wide beam, narrow beam, etc.). Downlink control channel information, broadcast signals and messages, and broadcast data channels and control channels can be transmitted in wide beams. A wide beam may include a single wide beam transmitted at one time, or a sweep of narrow beams at sequential times. Multicast and unicast data and control signals and messages can be transmitted in narrow beams.

Identifiers of cells can be carried in the synchronization channel. Identifiers of arrays, beams, and the like, can be implicitly or explicitly carried in the downlink control channels (e.g., synchronization channel, physical broadcast channel, and the like). These channels can be sent over wide beams. By acquiring these channels, the mobile station (MS) can detect the identifiers.

A mobile station (MS) can also use one or more antennas or antenna arrays to carry out beam forming. As in BS antenna arrays, antenna arrays at the MS can form beams with different widths (e.g., wide beam, narrow beam, etc.). Broadcast signals and messages, and broadcast data channels and control channels can be transmitted in wide beams. Multicast and unicast data and control signals and messages can be transmitted in narrow beams.

Figure 3A:
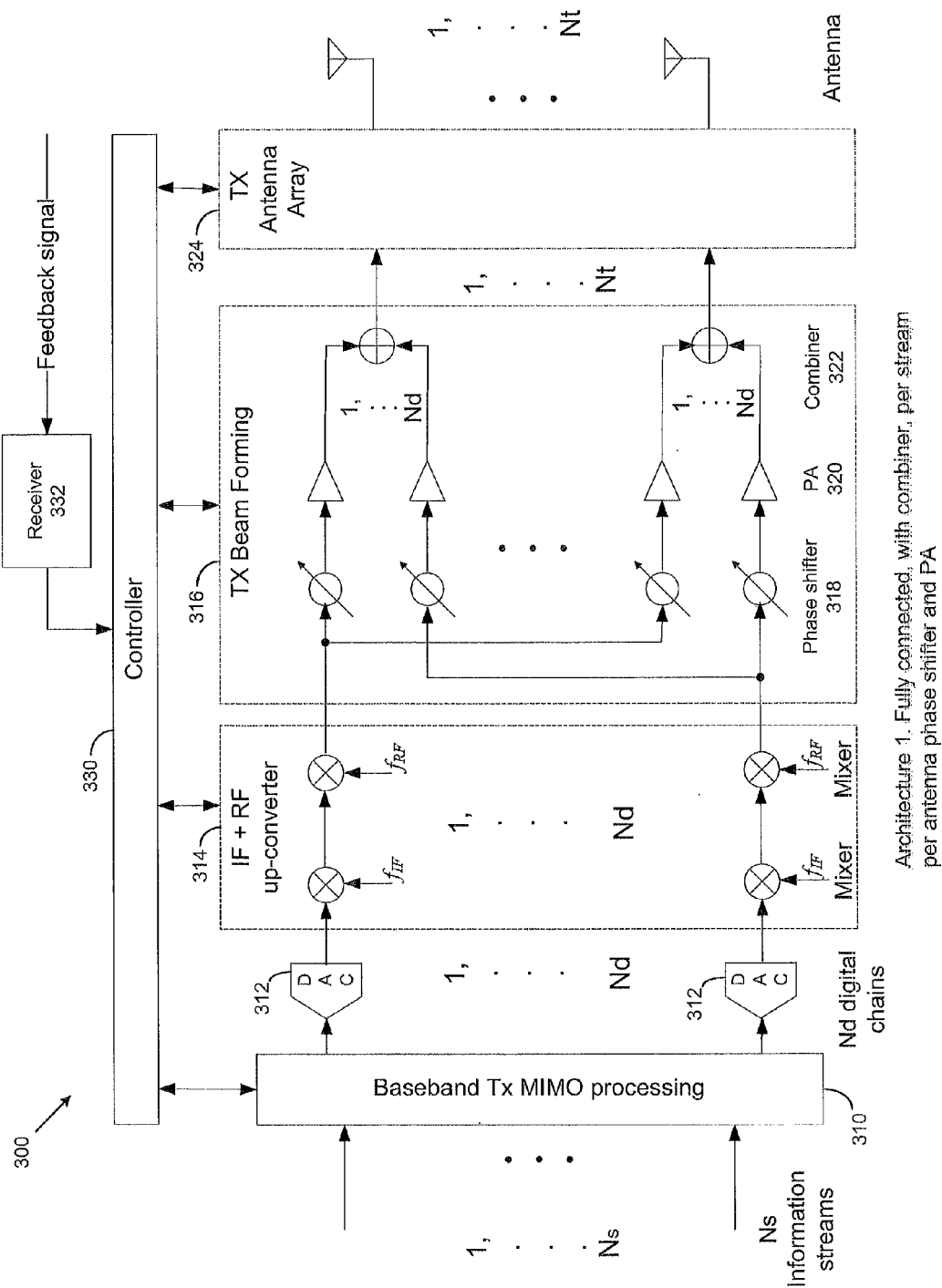
FIG. 3A illustrates a transmit path for multiple input multiple output (MIMO) baseband processing and analog beam forming with a large number of antennas, according to embodiments of this disclosure.

FIG. 3A illustrates a transmit path for multiple input multiple output (MIMO) baseband processing and analog beam forming with a large number of antennas, according to embodiments of this disclosure. The transmit path 300 includes a beam forming architecture in which all of the signals output from baseband processing are fully connected to all the phase shifters and power amplifiers (PAs) of the antenna array.

As shown in FIG. 3A, Ns information streams are processed by a baseband processor (not shown), and input to the baseband TX MIMO processing block 310. After the baseband TX MIMO processing, the information streams are converted at a digital and analog converter (DAC) 312, and further processed by an interim frequency (IF) and radio frequency (RF) up-converter 314, which converts the baseband signal to the signal in RF carrier band. In some embodiments, one information stream can be split to I (in-phase) and Q (quadrature) signals for modulation. After the IF and RF up-converter 314, the signals are input to a TX beam forming module 316.

FIG. 3A shows one possible architecture for the beam forming module 316, where the signals are fully connected to all the phase shifters and power amplifiers (PAs) of the transmit antennas. Each of the signals from the IF and RF up-converter 314 can go through one phase shifter 318 and one PA 320, and via a combiner 322, all the signals can be combined to contribute to one of the antennas of the TX antenna array 324. In FIG. 3A, there are Nt transmit antennas in the TX array 324. Each antenna transmits the signal over the air. A controller 330 can interact with the TX modules including the baseband processor, IF and RF up-converter 314, TX beam forming module 316, and TX antenna array module 324. A receiver module 332 can receive feedback signals and the feedback signals can be input to the controller 330. The controller 330 can process the feedback signal and adjust the TX modules.

Figure 3B:
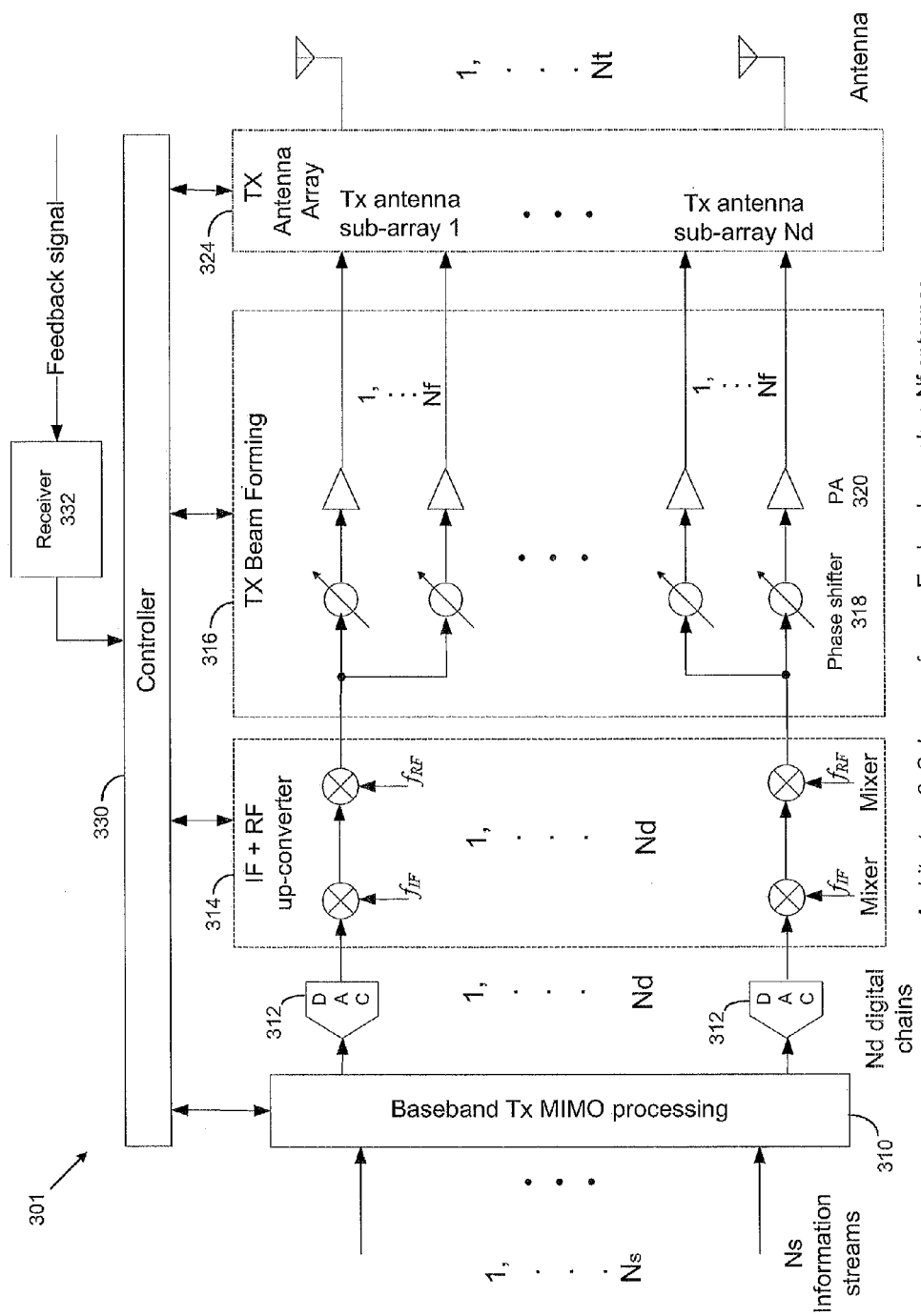
FIG. 3B illustrates another transmit path for MIMO baseband processing and analog beam forming with a large number of antennas, according to embodiments of this disclosure.

FIG. 3B illustrates another transmit path for MIMO baseband processing and analog beam forming with a large number of antennas, according to embodiments of this disclosure. The transmit path 301 includes a beam forming architecture in which a signal output from baseband processing is connected to the phase shifters and power amplifiers (PAs) of a sub-array of the antenna array. The transmit path 301 is similar to the transmit path 300 of FIG. 3A, except for differences in the beam forming module 316.

As shown in FIG. 3B, the signal from the baseband is processed through the IF and RF up-converter 314, and is input to the phase shifters 318 and power amplifiers 320 of a sub-array of the antenna array 324, where the sub-array has Nf antennas. For the Nd signals from baseband processing (e.g., the output of the MIMO processing), if each signal goes to a sub-array with Nf antennas, the total number of transmitting antennas Nt should be Nd*Nf. The transmit path 301 includes an equal number of antennas for each sub-array. However, the disclosure is not limited thereto. Rather, the number of antennas for each sub-array need not be equal across all sub-arrays.

The transmit path 301 includes one output signal from the MIMO processing as the input to the RF processing with one sub-array of antennas. However, this disclosure is not limited thereto. Rather, one or multiple signals out of the Nd signals from base band processing (e.g., the output of the MIMO processing) can be the inputs to one of the sub-arrays. When multiple output signals from the MIMO processing are as the inputs to one of the sub-arrays, each of the multiple output signals from the MIMO processing can be connected to part of or all of the antennas of the sub-array. For example, the RF and IF signal processing with each of the sub-array of antennas can be the same as the processing with the array of antennas as in FIG. 3A, or any type of the RF and IF signal processing with an array of antennas. The process related to one sub-array of the antennas may be referred to as one "RF chain".

Figure 3C:
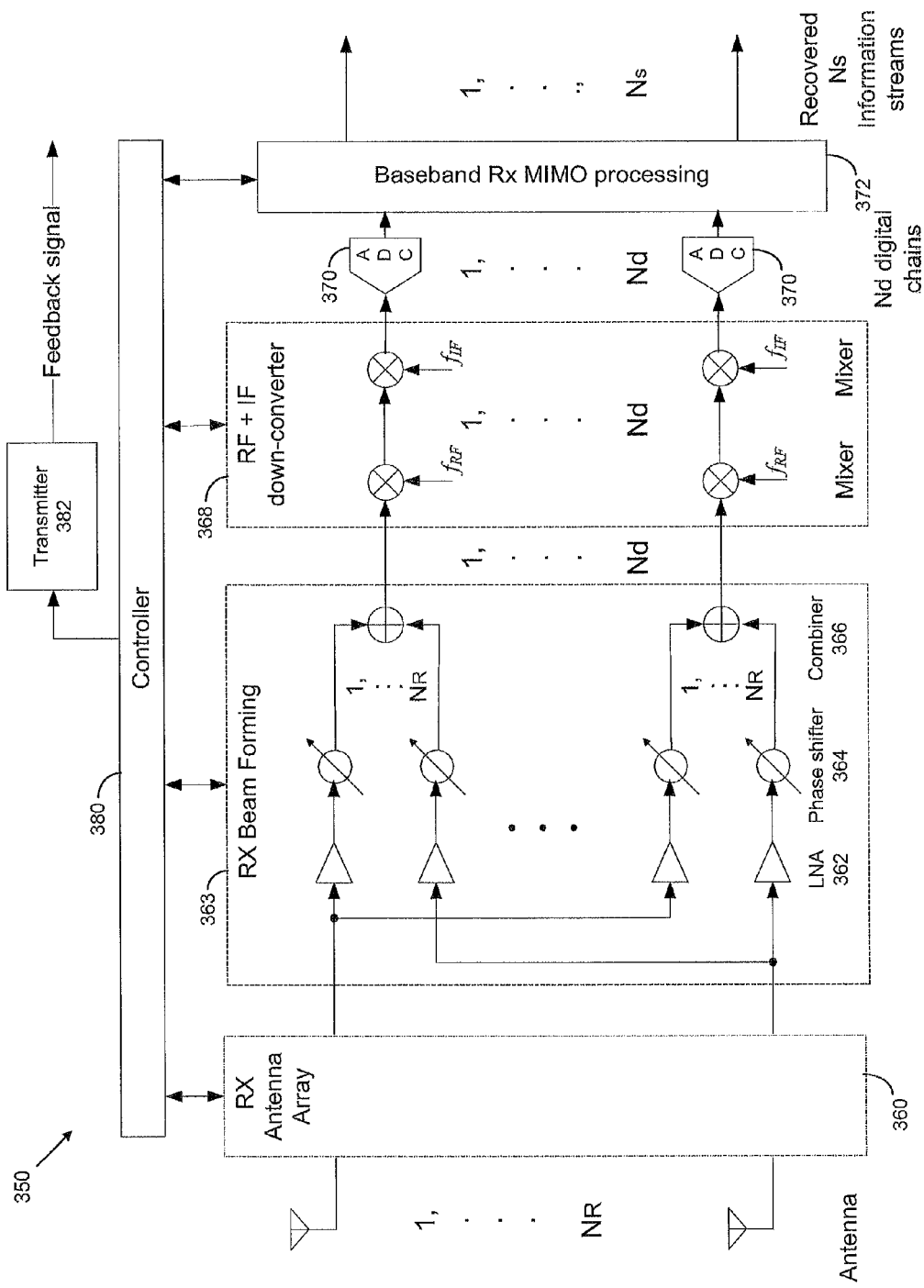
FIG. 3C illustrates a receive path for MIMO baseband processing and analog beam forming with a large number of antennas, according to embodiments of this disclosure.

FIG. 3C illustrates a receive path for MIMO baseband processing and analog beam forming with a large number of antennas, according to embodiments of this disclosure. The receive path 350 includes a beam forming architecture in which all of the signals received at the RX antennas are processed through an amplifier (e.g., a low noise amplifier (LNA)) and a phase shifter. The signals are then combined to form an analog stream that can be further converted to the baseband signal and processed in a baseband.

As shown in FIG. 3C, NR receive antennas 360 receive the signals transmitted by the transmit antennas over the air. The signals from the RX antennas are processed through the LNAs 362 and the phase shifters 364. The signals are then combined at a combiner 366 to form an analog stream. In total, Nd analog streams can be formed. Each analog stream can be further converted to the baseband signal via a RF and IF down-converter 368 and an analog to digital converter (ADC) 370. The converted digital signals can be processed in a baseband RX MIMO processing module 372 and other baseband processing, to obtain the recovered NS information streams. A controller 380 can interact with the RX modules including baseband processor, RF and IF down-converter 368, RX beam forming module 363, and RX antenna array module 360. The controller 380 can send signals to a transmitter module 382, which can send a feedback signal. The controller 380 can adjust the RX modules and determine and form the feedback signal.

Figure 3D:
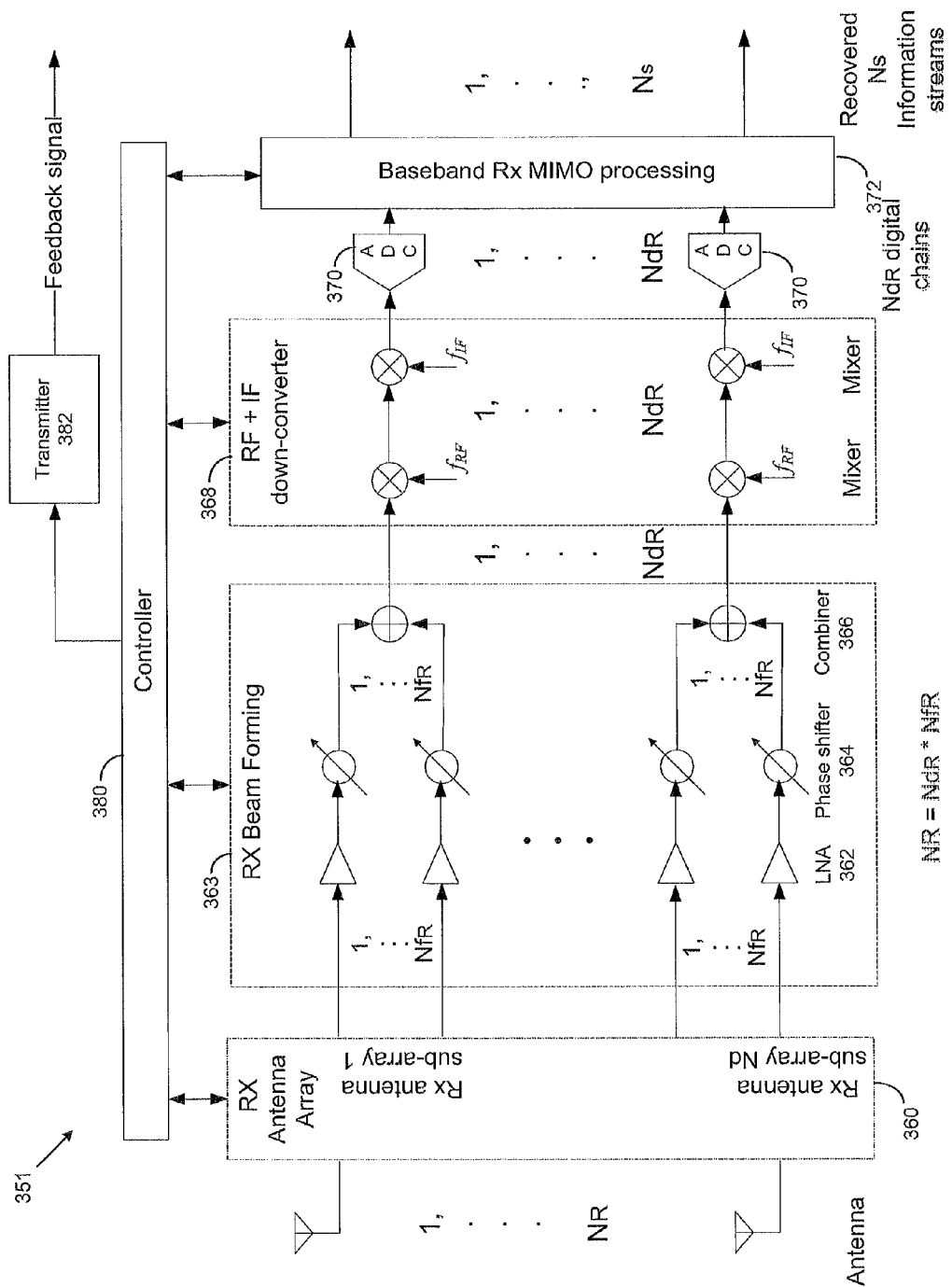
FIG. 3D illustrates another receive path for MIMO baseband processing and analog beam forming with a large number of antennas, according to embodiments of this disclosure.

FIG. 3D illustrates another receive path for MIMO baseband processing and analog beam forming with a large number of antennas, according to embodiments of this disclosure. The receive path 351 includes a beam forming architecture in which the signals received by a sub-array of the antenna array can be processed by amplifiers and phase shifters, to form an analog stream which can be converted and processed in the baseband. The receive path 351 is similar to the receive path 350 of FIG. 3C, except for differences in the beam forming module 363.

As shown in FIG. 3D, the signals received by NfR antennas of a sub-array of the antenna array 360 are processed by the LNAs 362 and phase shifters 364, and are combined at combiners 366 to form an analog stream. There can be NdR sub-arrays (NdR=NR/NFR), with each sub-array forming one analog stream. Hence, in total, NdR analog streams can be formed. Each analog stream can be converted to the baseband signal via a RF and IF down-converter 368 and an ADC 370. The NdR digital signals are processed in the baseband module 372 to recover the Ns information streams. The receive path 351 includes an equal number of antennas for each sub-array. However, the disclosure is not limited thereto. Rather, the number of antennas for each sub-array need not be equal across all sub-arrays.

The receive path 351 includes one output signal from the RF processing with one sub-array of antennas, as one of the inputs to the baseband processing. However, this disclosure is not limited thereto. Rather, one or multiple output signals from the RF processing with one sub-array of antennas, can be the inputs to the baseband processing. When multiple output signals from the RF processing with one sub-array of antennas are the inputs, each of the multiple output signals from the RF processing with one sub-array of antennas, can be connected to part of or all of the antennas of the said sub-array. For example, the RF and IF signal processing with each of the sub-array of antennas can be the same as the processing with the array of antennas as in FIG. 3C, or any type of the RF and IF signal processing with an array of antennas. The process related to one sub-array of the antennas can be referred to as one "RF chain".

In other embodiments, there can be other transmit and receive paths which are similar to the paths in FIGS. 3A through 3D, but with different beam forming structures. For example, the power amplifier 320 can be after the combiner 322, so the number of amplifiers can be reduced.

Figure 4:
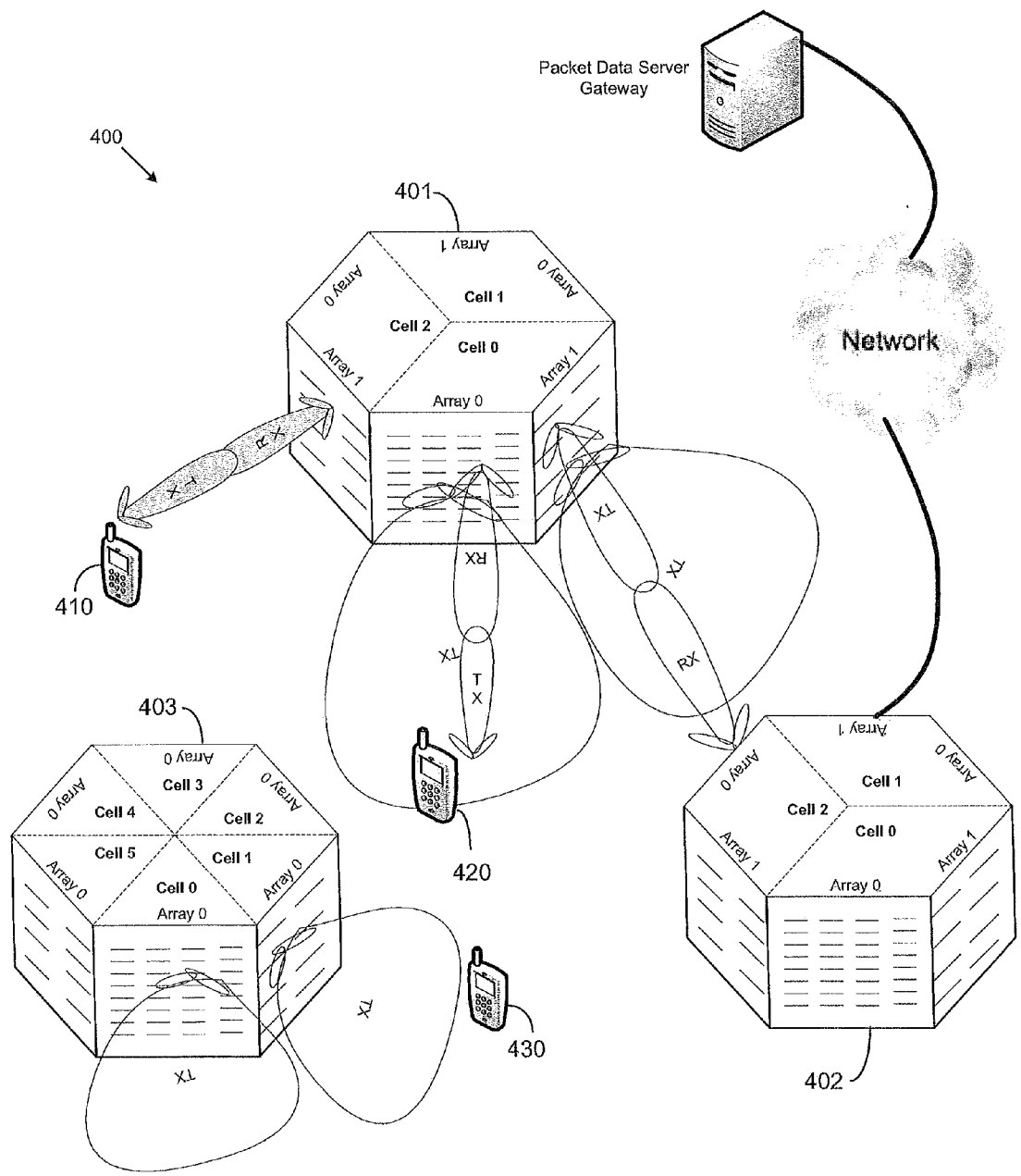
FIG. 4 illustrates a wireless communication system using antenna arrays, according to an embodiment of this disclosure.

FIG. 4 illustrates a wireless communication system using antenna arrays, according to an embodiment of this disclosure. The embodiment of wireless communication system 400 illustrated in FIG. 4 is for illustration only. Other embodiments of the wireless communication system 400 could be used without departing from the scope of this disclosure.

As shown in FIG. 4, system 400 includes base stations 401-403 and mobile stations 410-430. Base stations 401-403 may represent one or more of base stations 101-103 of FIG. 1. Likewise, mobile stations 410-430 may represent one or more of subscriber stations 111-116 of FIG. 1.

BS 401 includes three cells, cell 0, cell 1, and cell 2. Each cell includes two arrays, array 0 and array 1. In cell 0 of BS 401, antenna array 0 and array 1 may transmit the same downlink control channels on a wide beam. However, array 0 can have a different frame structure from array 1. For example, array 0 may receive uplink unicast communication from MS 420, while array 1 can transmit downlink backhaul communication with cell 2 array 0 of BS 402. BS 402 includes a wired backhaul connecting to one or more backhaul networks. A synchronization channel (SCH) and broadcast channel (BCH) can also be transmitted over multiple beams with a beam width not as wide as the widest transmission beam from BS 401 shown in FIG. 4. Each of these multiple beams for the SCH or BCH may have a beam width wider than beams for unicast data communication, which can be for communication between a base station and a single mobile station.

Throughout the disclosure, the transmit beams can be formed by a transmit path such as shown in FIGS. 3A and 3B. Likewise, the receive beams can be formed by a receive path such as shown in FIGS. 3C and 3D.

One or more of the wireless links illustrated in FIG. 4 may be broken due to a LOS blockage (e.g., objects such as people or cars move into the LOS) or a NLOS may not have rays strong enough to maintain the communication. Even if a MS is close to a BS and the MS only moves a short distance, the link may be broken. In such an event, the MS may need to switch links if the current link cannot be recovered. A MS may need to switch links even if the MS is not at the cell edge.

If each antenna in the arrays is not positioned at a high elevation, then TX or RX beams substantially covering a sphere may be used. For example, if each beam is shaped like a pencil, then at each sampling point of a 360-degree circle of azimuth search, a 180-degree elevation search may be needed. Alternatively, if each antenna is positioned at a high elevation, then at each sampling point of a 360-degree circle of azimuth search, a less than 180-degree elevation search may be sufficient.

Figure 5:
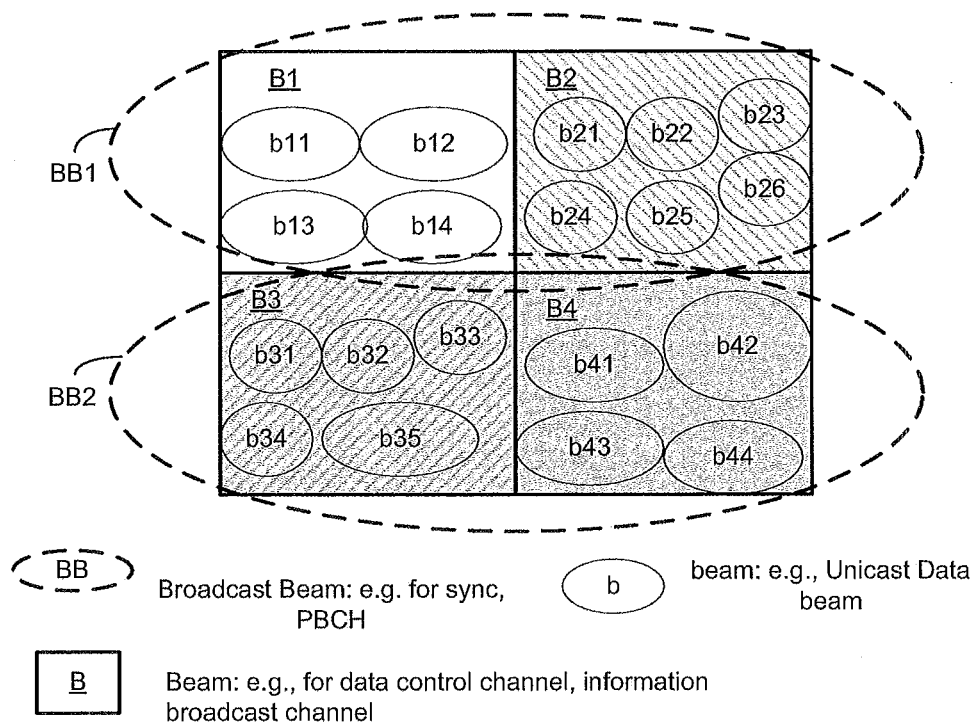
FIG. 5 illustrates an example of different beams having different shapes for different purposes in a sector or a cell, according to one embodiment of this disclosure.

FIG. 5 illustrates an example of different beams having different shapes and different beam widths for different purposes in a sector or a cell, according to an embodiment of this disclosure. The embodiment illustrated in FIG. 5 is for illustration only. Other embodiments could be used without departing from the scope of this disclosure. The sector/cell shown in FIG. 5 may represent one or more of the base station cells depicted in FIG. 4. Throughout the disclosure, the beams (including TX beams and RX beams) can have various beam widths or various shapes, including regular or irregular shapes, not limited by those in the figures.

In a sector or a cell, one or multiple arrays with one or multiple RF chains can generate beams in different shape for different purposes. In FIG. 5, the vertical dimension can represent elevation, and the horizontal dimension can represent azimuth. As shown in FIG. 5, wide beams BB1, BB2 (also called broadcast beams, or "BB") may be configured for synchronization, physical broadcast channel, or a physical configuration indication channel that indicates where the physical data control channel is located, etc. The wide beams BB1, BB2 can carry the same information for the cell.

Although two wide beams BB1, BB2 are illustrated in FIG. 5, a cell may be configured for one or multiple BBs. When there are multiple BBs in a cell, the BBs can be differentiated by implicit or explicit identifier, and the identifier can be used by the MS to monitor and report BBs. The BB beams can be swept and repeated. The repetition of the information on BB beams may depend on the MS's number of RX beams to receive the BB beam. That is, in an embodiment, the number of repetitions of the information on BB beams may be no less than the number of RX beams at the MS to receive the BB beam.

Wide control channel beams B1-B4 (collectively, "B beams") can be used for control channels. Control channel beams B1-B4 may or may not use the same beam width as wide beams BB1, BB2. Beams B1-B4 may or may not use the same reference signals as wide beams BB1, BB2 for the MS to measure and monitor. Wide beams B1-B4 are particularly useful for a broadcast or multicast to a group of MSs, as well as control information for certain MS, such as MS-specific control information, e.g., the resource allocation for a MS.

Although four control channel beams B1-B4 are illustrated in FIG. 5, a cell may be configured for one or multiple B beams. When there are multiple B beams in a cell, the B beams can be differentiated by implicit or explicit identifier, and the identifier can be used by the MS to monitor and report the B beams. The B beams can be swept and repeated. The repetition of the information on B beams can be depending on the MS's number of RX beams to receive the B beam. That is, in an embodiment, the number of repetitions of the information on B beams may be no less than the number of RX beams at the MS to receive the B beams. A MS may or may not search for beams B1-B4 by using the information on beams BB1, BB2.

Beams b11-b44 (collectively, "b beams") may be used for data communication. A b beam may have an adaptive beam width. For some MSs (e.g., a MS with low speed), a narrower beam can be used, and for some MSs, a wider beam can be used. Reference signals can be carried by b beams. Although nineteen b beams are illustrated in FIG. 5, a cell may be configured for one or multiple b beams. When there are multiple b beams in a cell, the b beams can be differentiated by implicit or explicit identifier, and the identifier can be used by the MS to monitor and report the b beams. The b beams can be repeated. The repetition of the information on the b beams may depend on the MS's number of RX beams to receive the b beam. That is, in an embodiment, the number of repetitions of the information on b beams may be no less than the number of RX beams at the MS to receive the b beams. A TX beam b can be locked with a RX beam after the MS monitors the beams. If the data information is sent over a locked RX beam, the repetition of the information on the b beam may not be needed.

Figure 6:
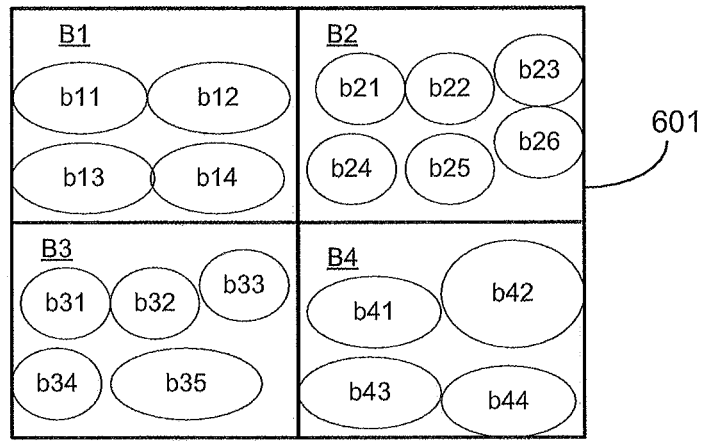
FIG. 6 illustrates the use of beams to carry the same or different information to a mobile station or base station in a cell, according to embodiments of this disclosure.
Figure 6:
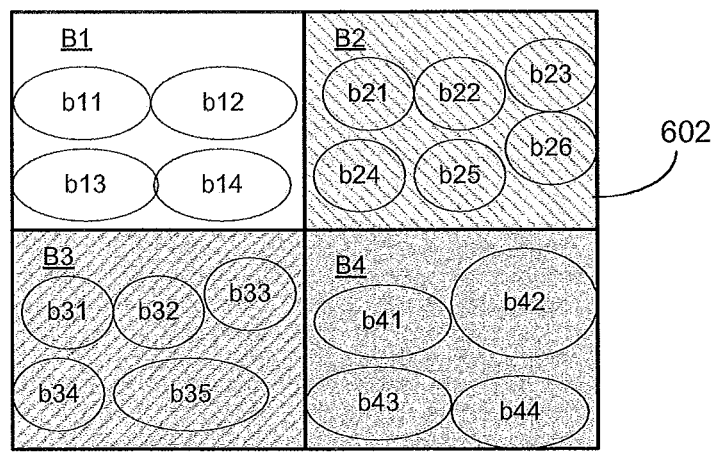
Figure 6:
Figure 6:
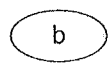

FIG. 6 illustrates the use of beams to carry the same or different information to a mobile station or base station in a cell, according to embodiments of this disclosure. The embodiments illustrated in FIG. 6 are for illustration only. Other embodiments could be used without departing from the scope of this disclosure.

As shown in FIG. 6, beams B1-B4 (collectively, "B beams") may be configured for control channels, such as control information broadcast/multicast to a group of devices such as MSs and BSs, as well as control information for certain devices (e.g., MS- or BS-specific control information, such as a resource allocation for a MS). The control channel can be, e.g., a physical downlink control channel (PDCCH), which provides common information regarding the resource allocation (e.g., resource blocks, power control, etc.), resource allocation information of the system information blocks (SIBS) to all the MSs in the cell, and MS-specific information about the resource allocation to a certain MS.

All the B beams in a cell may send the same information to all MSs in a cell. The B beams may explicitly or implicitly carry identifiers for the MS to identify them, for monitoring and reporting purposes. In some embodiments, the B beams may not carry any identifier information. In such cases, the MS may not be able to identify them, and the B beams operate like a wide beam which has a coverage of all the B beams in the cell.

In some embodiments, the B beams in a cell may send different information to MSs in a cell. Such B beams may explicitly or implicitly carry identifiers for the MS to identify them, for monitoring and reporting purposes. The B beam may send information related to the MSs in its coverage, e.g., the resource allocation (e.g., resource block, power control, etc.) for the data beams to the MSs in its coverage.

A combination of the above can also be applicable. For example, the control information can be divided into two categories. For example, one category is common information which is common to all MSs in the cell, and the other category is the information associated only with a group of MSs within each B beam's coverage. The common information for the entire group of MSs in the cell can be sent over all B beams, while the information only associated with the MSs in B beam coverage can be sent over the said B beam.

In a sector or a cell, one or multiple arrays with one or multiple RF chains can generate beams in different shapes for different purposes. One RF chain can be for one or multiple antenna subarrays. One antenna subarray can form one or multiple beams.

Digital beamforming can be carried out on the baseband MIMO processing. Analog beam forming can be carried out by adjusting the phase shifter, the power amplifier (PA), or the low noise amplifier (LNA). Wide beams can be formed by analog beamforming, or both analog and digital beamforming. Narrow beams can be formed by both analog and digital beamforming.

Figure 7:
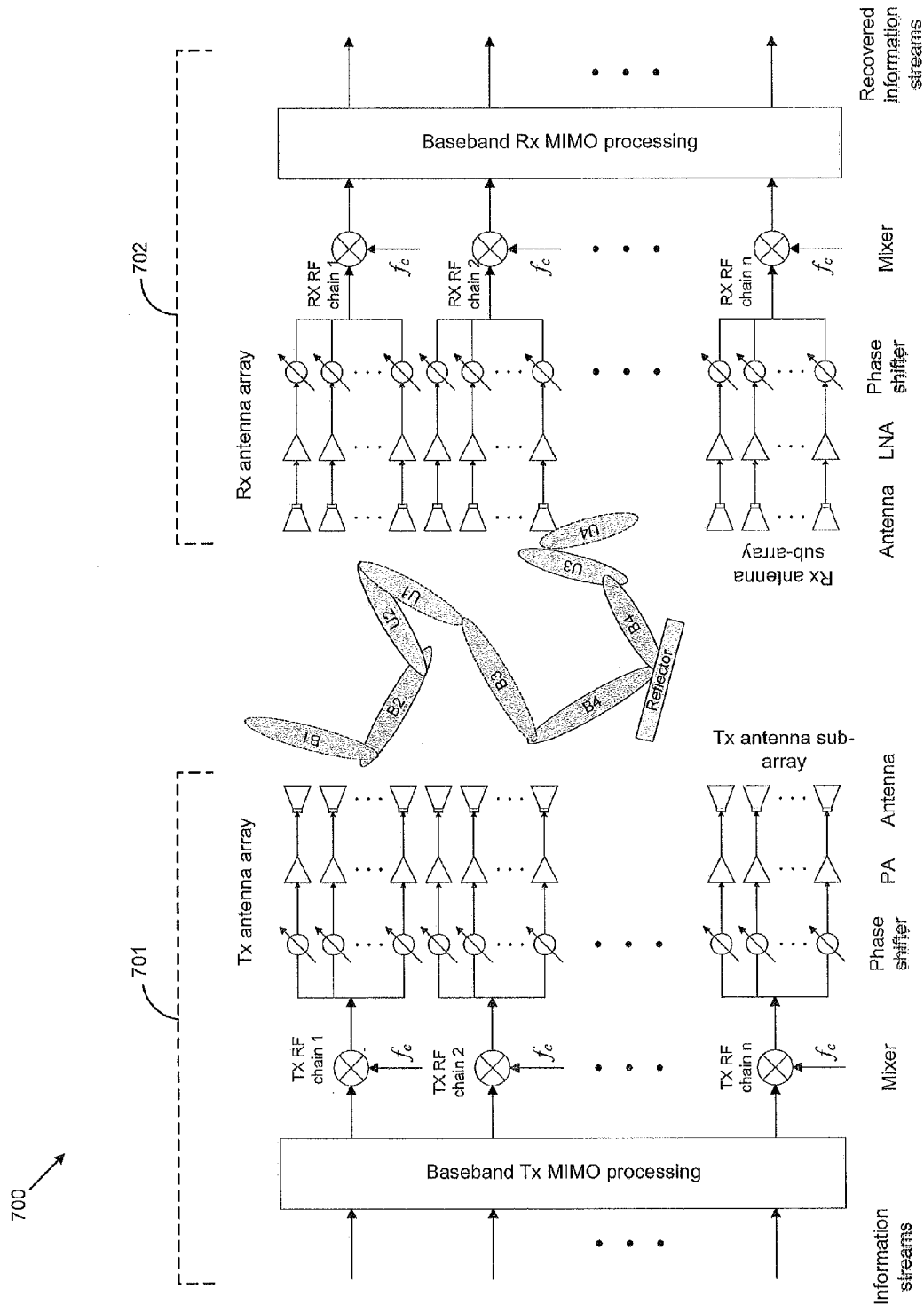
FIG. 7 illustrates an example of signal processing in a transmitter and a receiver in a millimeter wave system, according to an embodiment of this disclosure.

FIG. 7 illustrates an example of signal processing in a transmitter and a receiver in a millimeter wave system, according to an embodiment of this disclosure. The embodiment of millimeter wave system 500 illustrated in FIG. 7 is for illustration only. Other embodiments of millimeter wave system 700 could be used without departing from the scope of this disclosure.

In FIG. 7, millimeter wave system 700 includes a transmitter 701 and a receiver 702. Transmitter 701 may represent one or more of base stations 401-403 or mobile stations 410-430 of FIG. 4. Likewise, receiver 702 may represent one or more of base stations 401-403 or mobile stations 410-430. Transmitter 701 includes a plurality of transmit (TX) RF chains 1-n. Receiver 702 includes a plurality of receive (RX) RF chains 1-n. TX RF chain 1 forms beams B1 and B2. B1 and B2 can be formed by beam steering. That is, B1 and B2 are not concurrent beams, rather, they are formed one after another in the time domain. TX RF chain 2 forms beams B3 and B4. B3 and B4 can be formed by beam steering. RX RF chain 1 forms beams U1 and U2. U1 and U2 can be formed by beam steering. RX RF chain 2 forms beams U3 and U4. U3 and U4 can be formed by beam steering. As shown in FIG. 7, U2 can receive B2. U3 can receive B4 after B4 is reflected by a reflector. B3 can reach U1. Thus, there are three possible links (B2, U2), (B3, U1), (B4, U3). Because the beams from each RF chain are formed by beam steering, the three links (B2, U2), (B3, U1), (B4, U3) are not concurrent. Two possible concurrent connections are (B2, U2) and (B4, U3) as shown in FIG. 7.

The B beams may also include the information of b beams in the other B beams' coverage. For example, considering FIGS. 6 and 7 together, the data control beam B1 can include information about the data beam b21 if the base station determines that the data beam b21 will be used for data communication. The mobile station receives beam B1 and decodes B1, and determines that beam b21 is scheduled to be for the data communication.

One RF chain can be for one or multiple antenna subarrays. One antenna subarray can form one or multiple beams. Digital beamforming can be performed on the baseband MIMO processing. Analog beamforming can be performed by adjusting the phase shifter, the power amplifier (PA), or the low noise amplifier (LNA). The wide beams BB, B can be formed by analog beamforming, or by both analog and digital beamforming. The narrow beams can be formed by both analog and digital beamforming.

Figure 8A:
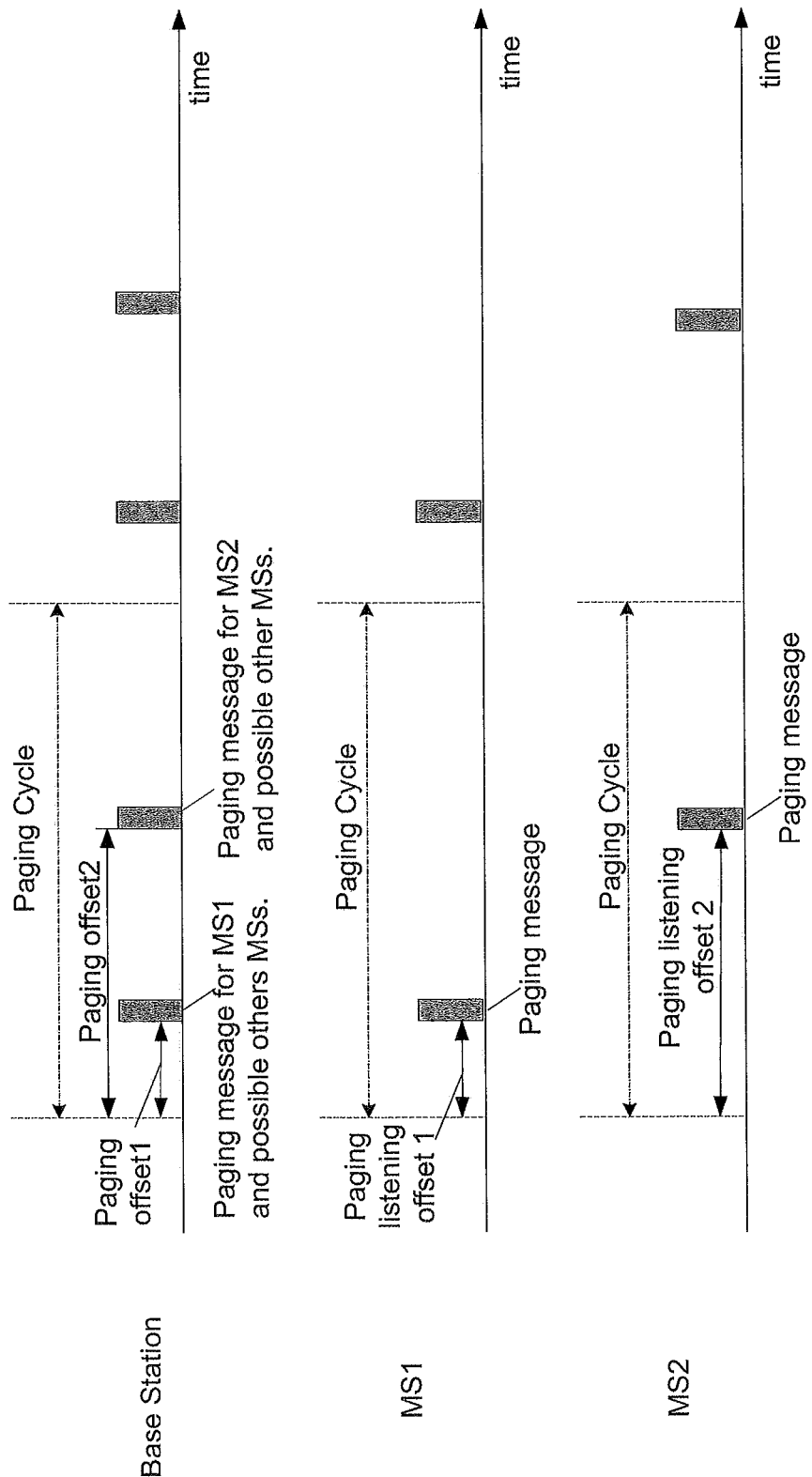
FIG. 8A illustrates a process of paging mobile stations in idle mode in a wireless communication system, according to an embodiment of this disclosure.

FIG. 8A illustrates a process of paging mobile stations in idle mode in a wireless communication system, according to an embodiment of this disclosure. The embodiment illustrated in FIG. 8A is for illustration only. Other embodiments could be used without departing from the scope of this disclosure.

In FIG. 8A, a paging controller (not shown) informs one or more base stations which mobile stations are to be paged. The base stations then broadcast a paging message, which includes identifiers of the mobile station identifiers and some other assisting information. The mobile stations in idle mode wake up at certain times to listen to the paging message. If a mobile station determines that its identifier is included in the paging message, then the mobile station knows it is paged, and it performs further actions such as exiting the idle mode and performing network re-entry. Otherwise, the mobile station enters a paging unavailable interval in which the MS is not listening and stays in idle mode.

In its idle mode, the MS can have a repeating period of paging listening time and paging listening unavailable time; the periodicity is called the paging cycle. In a paging cycle, the paging messages can be sent by BSs at one or more time offsets within the paging cycle. The timing for the BS to broadcast the paging messages to the MSs should be aligned with the timing for the respective MSs to listen for the paging messages. The timing alignment for the BS and MS can be achieved by explicit signaling or by using the same predefined algorithm at both BS and MS to calculate the timing information for the paging message. Such a predefined algorithm can include a function (e.g., hash function) of the paging cycle and desired timing offset for the paging, message within the paging cycle.

In a paging cycle, different MSs may be paged in different paging slots, so that the paging message can be shortened. For instance, MSs may be divided into groups with different groups of MSs being paged in different time offsets. The predefined algorithm at both the BS and MS to calculate the timing information for the paging message can be in addition to a function (e.g., a hash function) of MS identifiers, so that MS can know which interval contains the possible message for it; thus, MS does not need to listen when the intervals for other groups of MSs occur. The predefined algorithm, for instance, can hash MSs identifiers to the index of paging slots. For example, a hash algorithm may result in MSs with identifiers ending with 00, 01, 10, and 11 be in the first, second, third, and fourth slots, respectively. Other than predefined algorithms, explicit signaling can be additionally or alternatively used for the BS to notify the MS which slots to listen to. In some systems, to make the paging message shorter, the MS globally unique identifier can be hashed into a shorter identifier.

Figure 8B:
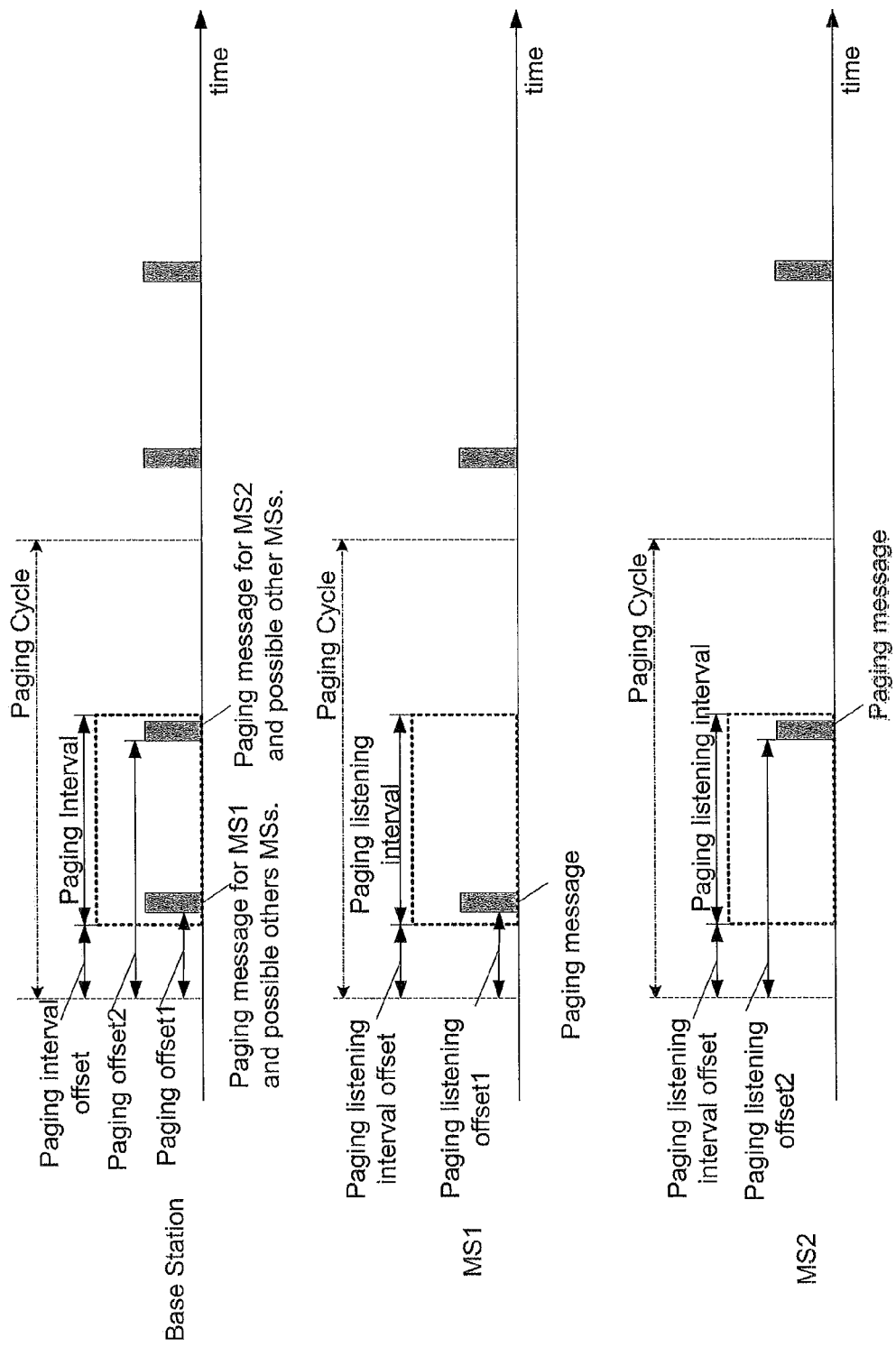
FIGS. 8B and 8C illustrate processes of paging mobile stations in idle mode that include a paging interval at the base station and a paging listening interval at the mobile station, according to embodiments of this disclosure.
Figure 8C:
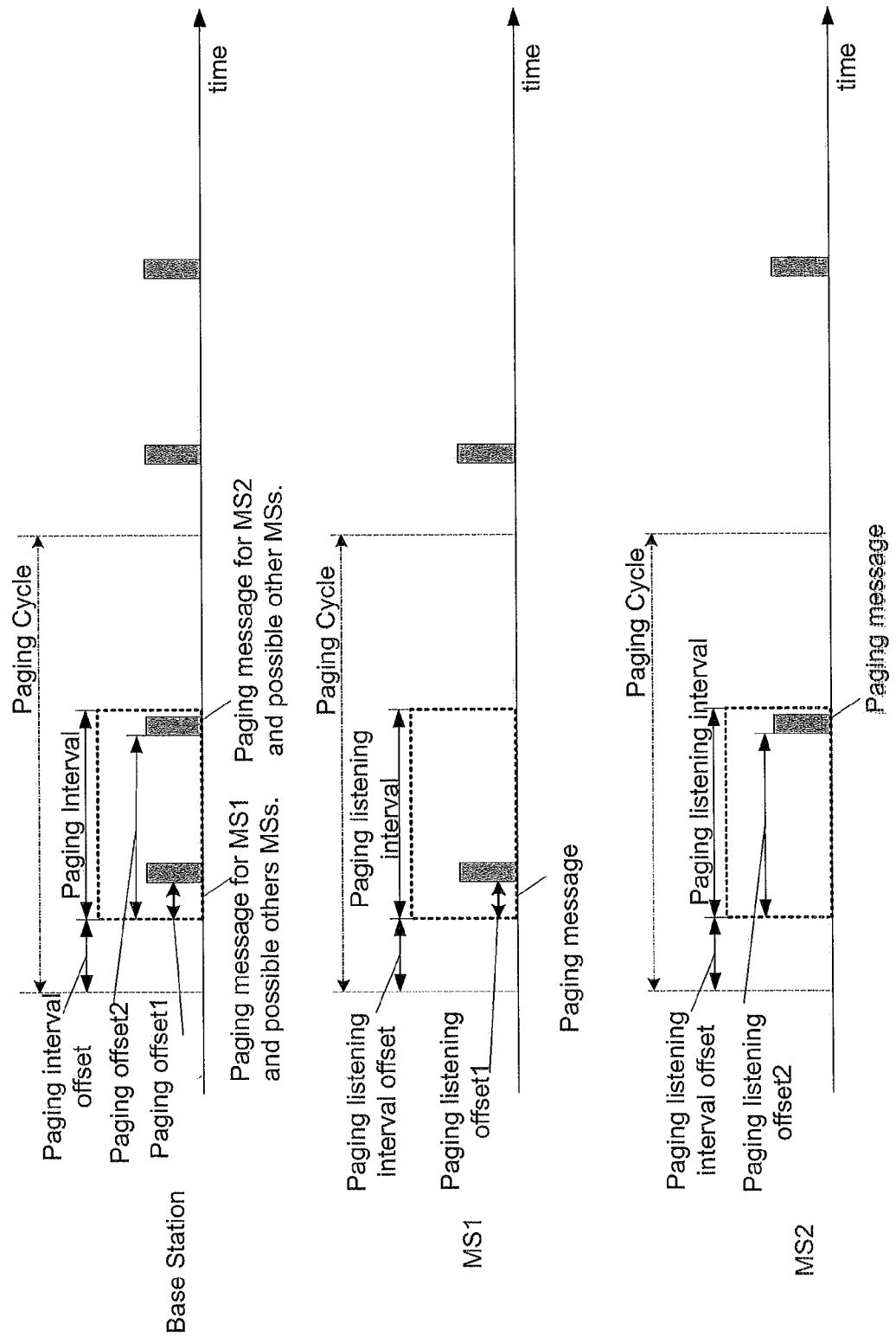

FIGS. 8B and 8C illustrate processes of paging mobile stations in idle mode that include a paging interval at the base station and a paging listening interval at the mobile station, according to embodiments of this disclosure. The embodiments illustrated in FIGS. 8B and 8C are for illustration only. Other embodiments could be used without departing from the scope of this disclosure.

As shown in FIGS. 8B and 8C, within a paging cycle, the BS can define one or multiple paging intervals, within which it pages the MSs. The paging interval offset determines the beginning time of the paging interval; usually the paging interval offset is an attribute of the BS. In many systems, the paging interval offset can be determined by the paging area identifier or the base station paging group ID (BSPG ID), where all of the base stations with the same BSPG ID can have a same paging interval offset. It is noted that a paging area can include many base stations where all the base stations share a BSPG ID. Likewise, a base station may be included in multiple paging areas; hence, a BS can have multiple BSPG IDs. Usually, the BS broadcasts its BSPG ID to one or more MSs. The MS has a paging listening interval offset according to the paging interval offset of BS. During one paging interval, the BS could page multiple groups of MSs, each group with a different paging listening offset (besides a common paging listening interval offset), which is related to MS identifiers. As shown in FIG. 8C, the paging listening offsets can be alternatively defined as relative to the beginning of the paging listening interval. In one listening interval, the MS does not need to listen all the time, but only listens when a message that may be relevant to the MS occurs. Again, all the timing offsets can be determined by explicit signaling, or by predefined algorithms at both the BS and the MS.

It is noted that in different system, the terms used in FIGS. 8A-8C, such as paging cycle, paging offset, paging message, paging interval, paging interval offset, and paging listening interval, can be referred to with different names. For the sake of clarity and convenience, this disclosure uses the terms used in FIGS. 8A-8C.

In an embodiment of the current disclosure, a MS sends a number or parameter M to the base station. Herein, M is the number of RX beam instances at the MS in idle mode for the receiver to finish one round of beam steering to cover the required spatial coverage. The MS can send the number M to the base station or the network, when the MS is in initial network entry, network reentry, or any stage when MS is connected. Alternatively, the MS can send the number M to the base station or network before the MS goes to idle state, or when the MS is performing a location update (e.g., when the MS detects a different paging zone, or paging ID, so that the MS needs to do a location update). Herein, a beam instance refers to one or multiple beams concurrently in use at one time. The term beam can be used interchangeably with beam pattern or pattern of a beam.

The number M can also be interpreted as the number of repetitions at the BS TX associated with allowing the RX to finish one round of beam steering to cover the required spatial coverage. The number M can also be interpreted as the number of RX beams per RE chain if each RF chain can steer the same number of RX beams, where a RF chain can be the signal processing chain for one antenna subarray of the antenna array. In particular cases, if all the RX beams are formed by beam steering one by one, the number M can be the number of RX beams.

Figure 9:
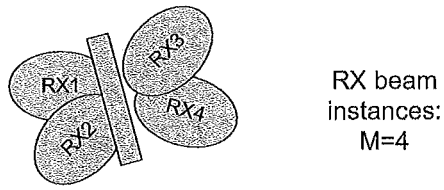
FIG. 9 illustrates examples of the number M according to embodiments of this disclosure.
Figure 9:
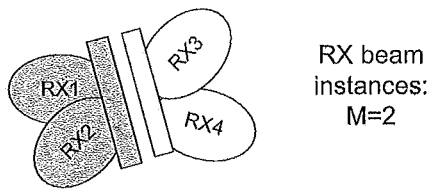

FIG. 9 illustrates examples of the number M according to embodiments of this disclosure. The embodiments illustrated in FIG. 9 are for illustration only. Other embodiments could be used without departing from the scope of this disclosure.

In Example 1 in FIG. 9, there are four RX beams from one RF chain by beam steering one beam at a time. It takes 4 RX beam instances to finish one round of RX beam steering, hence M=4. In Example 2, there are two RF chains or two subarrays, and each array forms two different beams. Two concurrent RX beams can be formed by having one RX beam from RE chain 1 and one RX beam from RF chain 2. In Example 2, it takes 2 RX beam instances to finish one round of RX beam steering (e.g., RX1 and RX3 in the first instance and RX2 and RX4 in the second instance), hence M=2.

In some embodiments, after a MS sends a number M to a BS or an network entity (such as a gateway), the base station or the network entity can further send the number M, together with the MS's identifier (e.g., MS ID), to the network or another network entity which may have the paging function facility such as paging controller. Here, M may be the number of the MS RX beam instances to use in the idle mode for the MS RX to finish one round of beam steering in idle mode.

In some embodiments, the network or the paging controller can use a predetermined or predefined algorithm to determine the timing for the BSs within the same paging zone (i.e., having the same PG ID) as the MS to send a paging message to the MS, taking into account the MS ID, the number M of the MS (which can be the number of the MS RX beam instances to use in the idle mode for the MS RX to finish one round of beam steering in idle mode), and other factors. If there is a paging message for the MS, where the MS belongs to a certain paging zone with certain paging identifier (PG ID), the network or the paging controller can then ask the base stations with the PG ID of the MS to send a paging message to the MS at the determined timing. In the paging zone with the PG ID of the MS, there may be one or multiple BSs. The BSs then sends the paging message to the MS at the time instructed by the network or by the paging controller.

The timing for the paging message or the timing for the BS to send the paging message can include the timing associated with the paging offset for the paging message, or the offset for the paging slot which contains the paging message or which is for the paging message, the timing for the BS to send the MS the paging information or paging message or portion of a paging message which is related to the MS, along which TX beam instance of the BS, within the paging slot for the paging message, and the like.

The paging offset for the paging message can be a function or a mapping (e.g., hash function) of the number M which can be the number of the MS RX beam instances to use for the MS RX to finish one round of beam steering in the idle mode of the MS, the mobile station identifiers or some sequences derived from mobile station identifiers, and/or other parameters such as base station identifiers, paging cycle, paging area identifiers, base station paging group identifiers, and the like.

For the timing for the BS to send the MS the paging information or paging message or portion of a paging message which is related to the MS within the paging slot for the paging message, the BS may include multiple parameters to define the timing itself, and each parameter can be a certain function of the number M which can be the number of the MS RX beam instances to use for the MS RX to finish one round of beam steering in the idle mode of the MS, the mobile station identifiers or some sequences derived from mobile station identifiers, and/or other parameters such as base station identifiers, paging cycle, paging area identifiers, base station paging group identifiers, and the like.

The MS uses the same predetermined algorithm as the network or the paging controller to determine the timing for the paging message, taking into account its MS ID, the number M, and other factors. The MS monitors the paging message at the determined timing by using its RX beams. If there is a message sent by the BSs, the MS can receive the paging message at the determined time and decode the message.

In certain embodiments, before the paging message is sent, the BS can also send a paging indicator indicating whether there will be a paging message or not in a certain superframe or frame, etc. (e.g., the current superframe or frame, etc., in which the paging indicator is sent). The MS first monitors the paging indicator using its RX beams. If the paging indicator indicates there is a paging message, then the MS further monitors the paging message sent at the determined time by the BSs. If the paging indicator indicates there is no paging message, the MS omits monitoring the paging message. In order for the MS to receive the paging indicator, since the MS has one or multiple RX beam instances, and the RX/TX beams are not yet trained, the BSs sends the paging indicator at least a predetermined number of times, where the predetermined number can be the maximum of the M parameters of all MSs.

Figure 10:
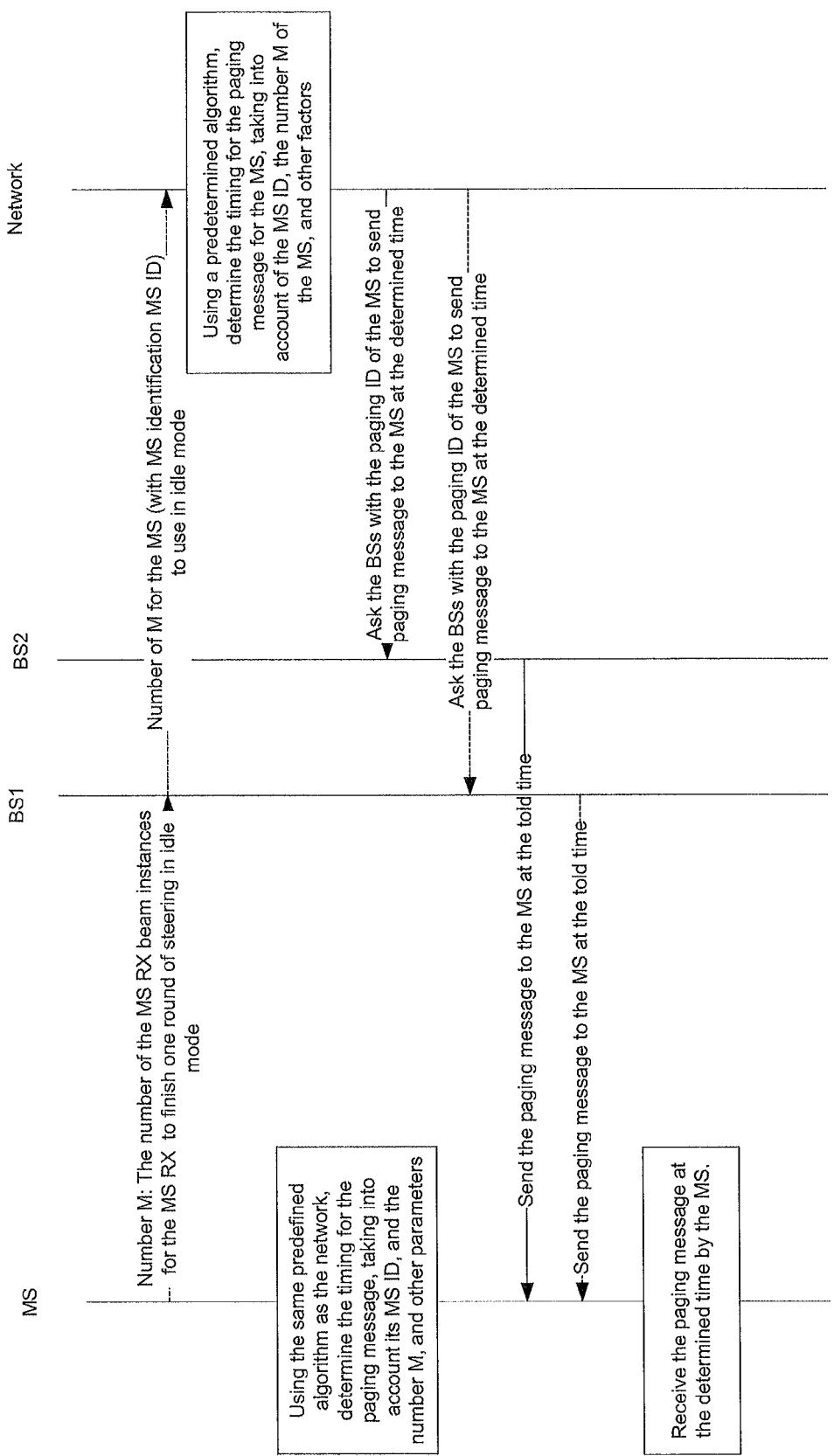
FIG. 10 illustrates an example of a procedure to determine the timing for the paging message, according to an embodiment of this disclosure.

FIG. 10 illustrates an example of a procedure to determine the timing for the paging message, according to an embodiment of this disclosure. The embodiment illustrated in FIG. 10 is for illustration only. Other embodiments could be used without departing from the scope of this disclosure.

As shown in FIG. 10, the network or the paging controller and the MS use the same predetermined algorithm to determine the timing for the paging message for the BSs with the same paging ID as the MS to send the paging message to the MS.

In some embodiments, if there is a paging message for the MS, where the MS belongs to a certain paging zone with a certain paging identifier (PG ID), the network or the paging controller can then ask the base stations with the same PG ID as the MS to send a paging message. The network or the paging controller may also send the MS ID of the MS and the number M of the MS (where the number M is as described above) to the base stations. In the paging zone with the PG ID of the MS, there may be one or multiple BSs. If the BS already knows the number M of the MS (e.g., the BS who forwarded the number M to the network from the MS), the network or the paging controller does not need to send the number M back to the BS. In some embodiments, it is also possible that the network can let all the BSs with the new PG ID of the MS know about the MS's number M, after the MS performs a location update.

In some embodiments, the base stations can use a predetermined algorithm to determine the timing for the BSs within the same paging zone (i.e., with the same PG ID) as the MS to send a paging message to the MS, taking into account the MS ID, the number M of the MS, and other factors. The BSs then sends the paging message to the MS at the determined timing.

The MS uses the same predetermined algorithm as the network or the paging controller to determine the timing for the paging message, taking into account its MS ID, the number M, and other factors. The MS monitors the paging message at the determined timing by using its RX beams. If there is a message sent by the BSs, the MS can receive the paging message at the determined time and decode the message.

The timing for the paging message or the timing for the BS to send the paging message can include the timing associated with the paging offset for the paging message, or the offset for the paging slot which contains the paging message or which is for the paging message, the timing for the BS to send the MS the paging information or paging message or portion of a paging message which is related to the MS, along which TX beam instance of the BS, within the paging slot for the paging message, and the like.

The paging offset for the paging message can be a function or a mapping (e.g., hash function) of the number M which can be the number of the MS RX beam instances to use for the MS RX to finish one round of beam steering in the idle mode of the MS, the mobile station identifiers or some sequences derived from mobile station identifiers, and/or other parameters such as base station identifiers, paging cycle, paging area identifiers, base station paging group identifiers, and the like.

For the timing for the BS to send the MS the paging information or paging message or portion of a paging message which is related to the said MS within the paging slot for the paging message, the BS may include multiple parameters to define the timing itself, and each parameter can be a certain function of the number M which can be the number of the MS RX beam instances to use for the MS RX to finish one round of beam steering in idle mode of the MS, the mobile station identifiers or some sequences derived from mobile station identifiers, and/or other parameters such as base station identifiers, paging cycle, paging area identifiers, base station paging group identifiers, etc.

Figure 11:
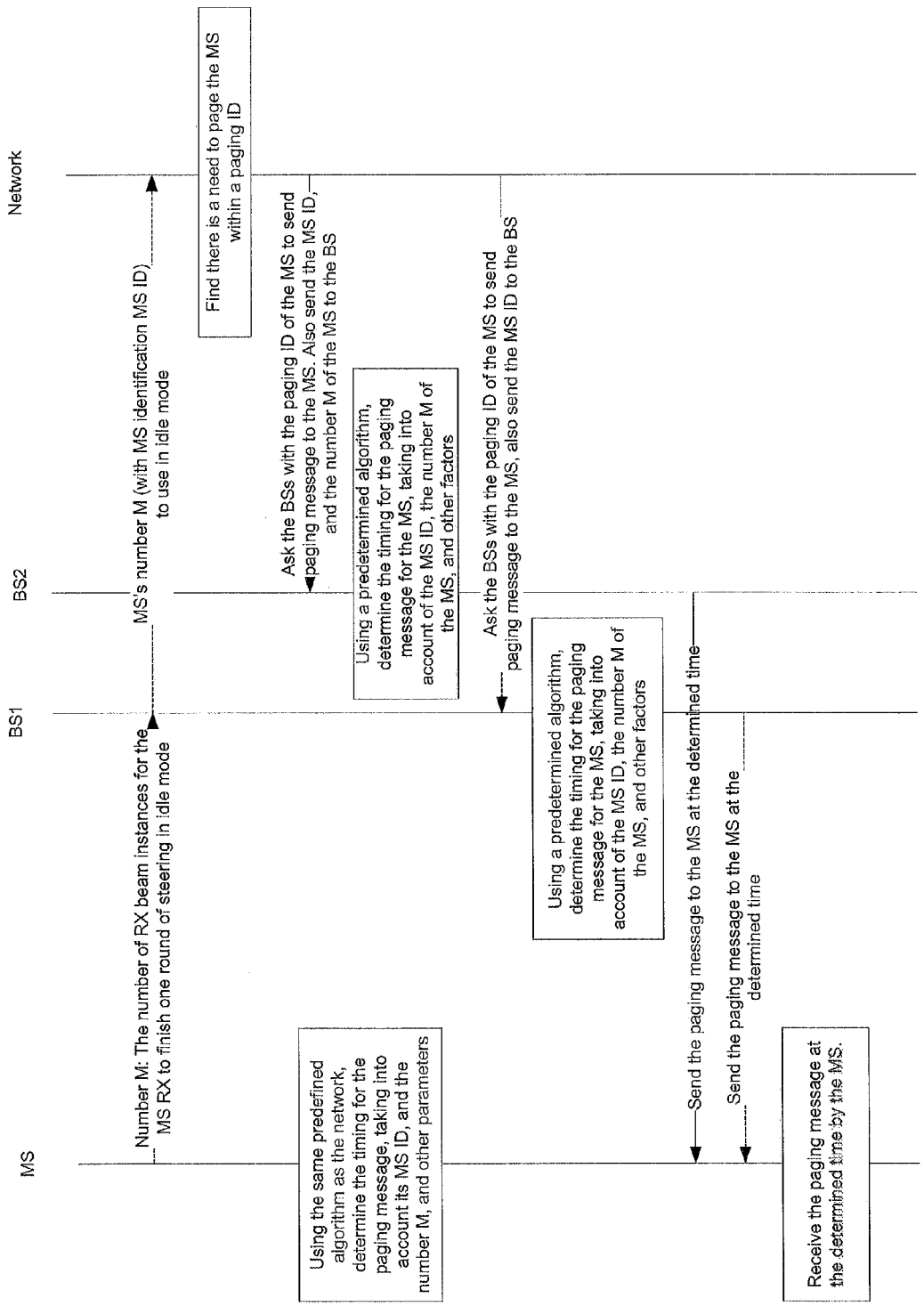
FIG. 11 illustrates an example of a procedure to determine the timing for the paging message, according to an embodiment of this disclosure.

FIG. 11 illustrates an example of a procedure to determine the timing for the paging message, according to an embodiment of this disclosure. The embodiment illustrated in FIG. 11 is for illustration only. Other embodiments could be used without departing from the scope of this disclosure.

As shown in FIG. 11, the BSs and the MS use the same predetermined algorithm to determine the timing for the paging message for the BSs with the same paging ID as the MS to send the paging message to the MS.

As an alternative, the number M for a MS (which can be the number of RX beam instances for the MS RX to finish one round of beam steering in idle mode) can be predetermined by the system, and both the network or network entities, including paging controller, base station, etc, and the MS, can know the number M. For example, the number M can be in the SIM card. The number M can also be transmitted by the network or base station to the MS, e.g., in the capability negotiation in initial network entry or network re-entry, or in any stage of the communication after the MS is in the system and before the idle state.

As another alternative, the number M may be related to the mobile device type. For example, one type of MS (e.g., a tablet having a certain size) can be associated with one value for M; another type of MS (e.g., a mobile phone) can be associated with another value for M; yet another type of MS (e.g., a laptop computer) can be associated with yet another value for M.

In some embodiments, a base station (BS) is capable of paging MSs on TX beams. The capability can be determined or configured by the network, or the capability can be pre-configured or pre-determined. For example, the capability can be fixed or pre-set, so that all BSs and MSs know the capability in advance. Additionally or alternatively, the BSs and MSs can be informed the first time when they connect to the system and they remember it. The capability can be configured by the network, or a network entity such as a gateway, an entity which may have the paging function facility such as paging controller, etc. Then the capability can be sent to the BS so that the BS will use the configured capability. In other cases, the BS can also send its general beam forming related capability (such as the number of RF chains, maximum number of beams supported, etc.) to the network or network entity. Then the network or network entity can further configure the particular capability for the BS to use to send paging related signals to the MS in idle mode. The network or network entity can make a decision by taking into account the general beam forming related capability of all the base stations in the same paging zone with a paging ID, etc.

The capability can include a number N, which is the number of TX beam instances at the BS to send a paging related signal to one or multiple MSs in idle mode so that the BS TX can finish one round of beam steering to cover the required spatial coverage. Here, a beam instance refers to one or multiple beams concurrently in use at one time. The term beam can be interchangeable with beam pattern, or pattern of a beam.

The number N can also be interpreted as the number of TX beams per RF chain if each RF chain can steer the same number of TX beams, where a RF chain can be the signal processing chain for one antenna subarray of the antenna array. In particular cases, if all the TX beams are formed by beam steering one by one, the number N can be the number of TX beams.

The capability of the BS on TX beams for paging MSs can also include a number K, which can be the number of rounds of BS TX beam instances or beam steering. Each TX beam instance occurs K times. In some embodiments, the number K is interpreted as the number of signal transmissions during a BS TX beam instance, such that it allows a receiver with no more than K RX beam instances or beam steering to have the chance to receive one signal transmission for each of the RX beam instance. For such cases, $K \geq \max(M\_i)$ for all $M\_i$ of $MS\_i$, where $MS\_i$ is with the BS.

However, in certain embodiments, the number K can be just the number of rounds of BS TX beam instances or beam steering, and the number K is independent of the number M-s of the MSs. For such, the number K may not be in the category of TX beam capability; however, the number K can serve as a parameter of the TX beam configuration.

Figure 12:
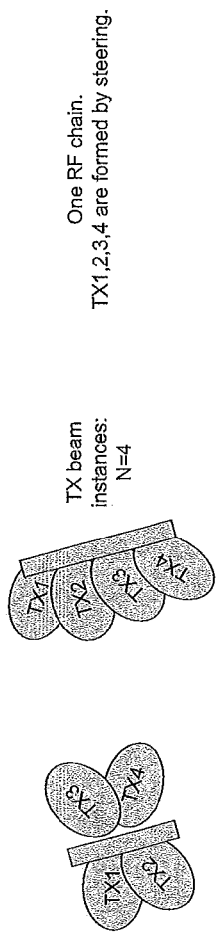
FIG. 12 illustrates examples of the number N according to an embodiment of this disclosure.
Figure 12:
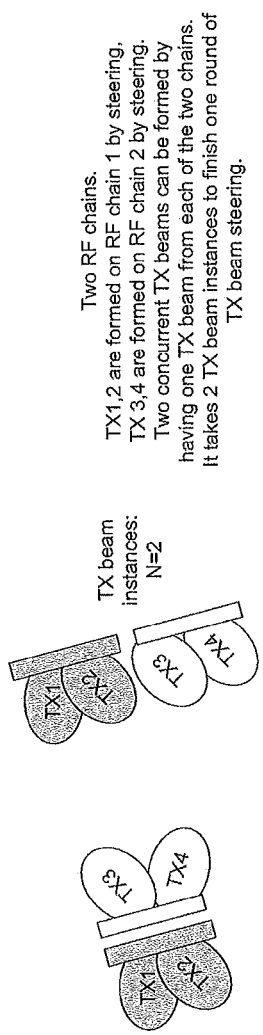

FIG. 12 illustrates examples of the number N according to an embodiment of this disclosure. The embodiment illustrated in FIG. 12 is for illustration only. Other embodiments could be used without departing from the scope of this disclosure.

In Example 1 of FIG. 12, there are four TX beams from one RF chain by beam steering one beam at a time. It takes 4 TX beam instances to finish one round of TX beam steering, hence N=4. In Example 2, there are two RF chains or two subarrays, and each array forms two different beams. Two concurrent TX beams can be formed by having one TX beam from RF chain 1, and one TX beam from RF chain 2. In Example 2, it takes 2 TX beam instances to finish one round of TX beam steering (e.g., TX1 and TX3 in the first instance and TX2 and TX4 in the second instance), hence N=2.

In some embodiments, the network can determine the timing for TX beam instances to send paging to the MS, taking into account the TX beam capability of all the base stations in the paging ID, paging IDs for each base station, etc. The TX beam instance timing to send paging related information to MS can include the start of each TX beam instance, the duration of each TX beam instance, the capability of the BS on TX beams for paging MSs, the number of TX beam instances, the number of rounds of TX beam instances, beam steering type, and the like.

The beam steering type can include Type 1, where the BS steers the beams while the MS holds one RX beam; and Type 2, where the BS holds one TX beam, while the MS steers the RX beams.

The network can inform the BSs about the determined timing for TX beam instances. The MS can obtain the timing for TX beam instances, as one of the inputs to calculate the RX timing to receive the paging message. The MS can obtain such information at any stage when the MS gets in the system, such as in the initial network entry, network reentry, in connected mode, before it goes to idle mode, etc. If the network reconfigures the timing for BS TX beam instances for paging related signal to be sent to the MS, such reconfiguration should be transmitted to the BSs and MSs; the BS and MS should also obtain any updated configurations or reconfigurations.

In certain embodiments, the timing for the BS to send TX beam instances for paging MSs can be preconfigured, preset, fixed, preassigned, or predefined. The BSs know the timing information and the BSs can inform the MSs about the timing information. Alternatively, the timing information could also be known by the MS when the MS is first getting into the system and the MS can remember the timing information.

Figure 13:
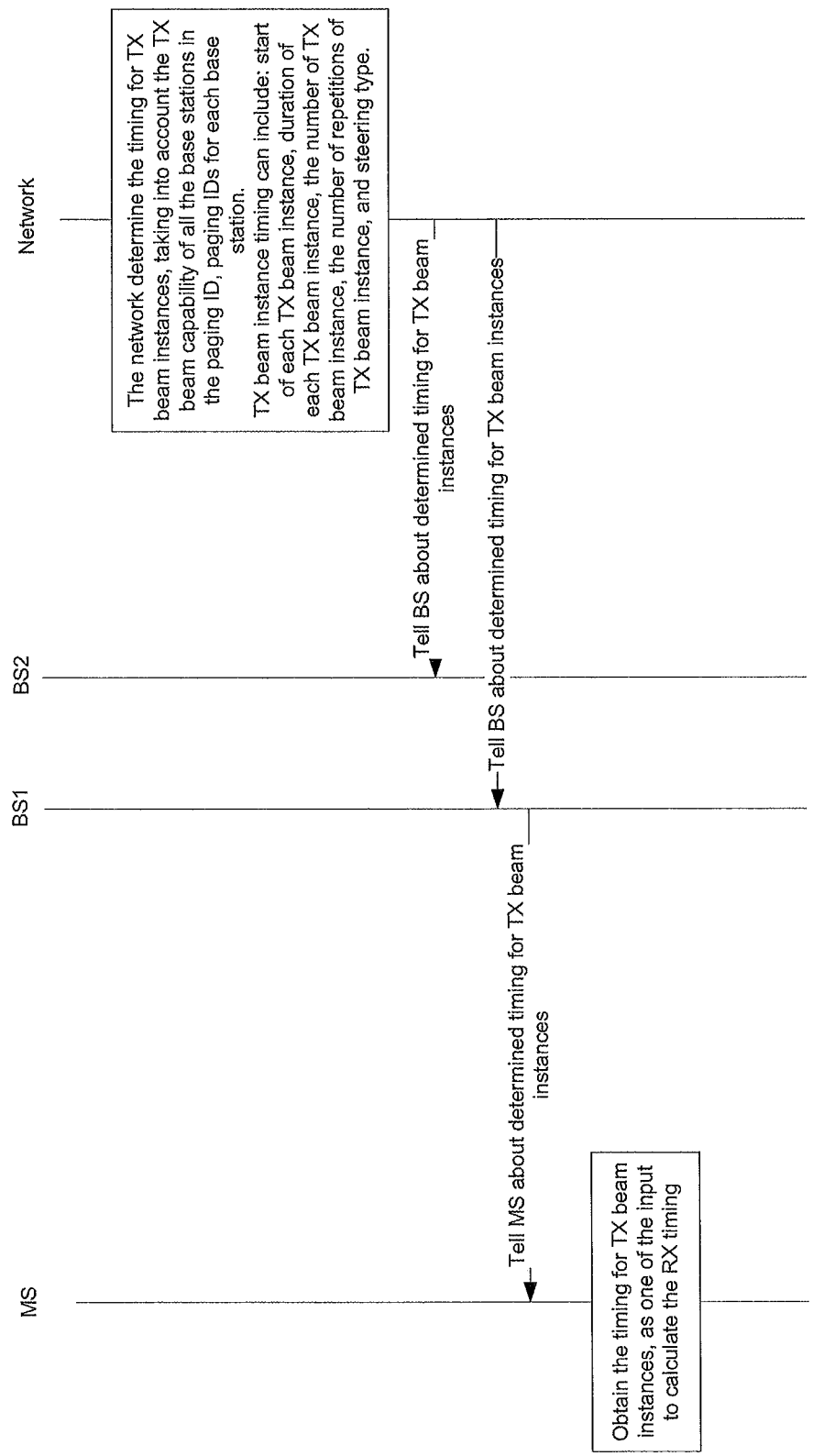
FIG. 13 illustrates an example procedure for conveying timing configuration information according to an embodiment of this disclosure.

FIG. 13 illustrates an example procedure for conveying timing configuration information according to an embodiment of this disclosure. The embodiment illustrated in FIG. 13 is for illustration only. Other embodiments could be used without departing from the scope of this disclosure.

As shown in FIG. 13, the network determines and informs the BSs about the configuration of the timing for TX beam instances to send a signal (e.g., paging related signal) to the MS in idle mode. The MS obtains such information as one of the inputs to determine the RX timing to receive signal in idle mode.

In some embodiments, the TX beam instance timing to send paging related information to MS can include one or more of the following: the start of each TX beam instance, the duration of each TX beam instance, the capability of the BS on TX beams for paging MSs, the number of TX beam instances, the number of rounds of TX beam instances, the beam steering type, the number of rounds of BS TX beam instances or beam steering within one round of BS TX beam instance, the time duration of each beam instance for N instances, the beginning time of a round of BS TX beam instances or beam steering, and the like. The TX beam instance timing can additionally or alternatively include the timing offset from the first beginning time, the offset from the beginning of the paging slot which contains the paging message, the offset from the beginning of the paging message within one beam instance, the time duration of each signal transmission for all K signals, and the like.

The beam steering type can include Type 1, where the BS steers the beams while the MS holds one RX beam; and Type 2, where the BS holds one TX beam, while the MS steers the RX beams.

Table 1 shows an example of the information the BS sends to the MS regarding the BS TX beam instances to be used to send paging related information.

TABLE 1

| Information | Notes |
| --- | --- |
| Modes of transmissions: '0' means Type 1 '1' means Type 2 | Type 1: The base station can steer the BS TX beams or beam instances to transmit signal. MS RX beam can hold for a certain direction while the BS TX beams or beam instances are steered. Then MS RX moves to next direction and hold the beam, while the BS TX beams start over the beam steering. Type 2: The base station can hold the BS TX beams for a certain direction to transmit signal while the MS RX beams are steered to different directions. Then the BS TX can move to another direction while the MS RX beams start over for the beam steering. |
| If Type 1, include Timing information for Type 1 | See below table |
| If Type 2, include Timing information for Type 2 | See below table |

For Type 1, the base station can steer the BS TX beams or beam instances, to transmit a signal. The MS RX beam can hold in a certain direction while the BS TX beams or beam instances are steered. Then the MS RX moves to the next direction and holds the beam, while the BS TX beams starts over with the beam steering.

The information of the BS TX beams for Type 1 can include, for example, some or all of the information shown in Table 2. The timing information can have units such as symbols, subframes, frames, and the like.

TABLE 2

| Information of BS TX beams for Type 1 | |
| --- | --- |
| The number of BS TX beam instances | N |
| The number of rounds of BS TX beam instances or beam steering | K |
| Within one round of BS TX beam instances, the time duration of each beam instance for N instances | $T\_Ins\_1, T\_Ins\_2, \ldots, T\_Ins\_N$ |
| If N instances are not immediately one after another, then it may also include the beginning time of each instance within the current round of instances (the beginning time of the first instance can be omitted if it is the same as the beginning time of a round of BS TX beam instances) (this can alternatively be timing offset from the beginning time of the current round of BS TX beam instances, timing offset from the first beginning time, or offset from the beginning of the paging slot which contains the paging message, or the offset from the beginning of the paging message) | $t\_Ins\_b\_2, t\_Ins\_b\_3, \ldots, t\_Ins\_b\_N$ |
| The time duration of each instance may also be included | $T\_Ins\_i\_j$, for $i = 1, \ldots, K$, and $j = 1, \ldots, N$ (i is the index of rounds, and j is the index of instances). If some of the durations are the same, then the information can be compressed. |
| The beginning time of a round of BS TX beam instances or beam steering (this can alternatively be timing offset from the first beginning time, or offset from the beginning of the paging slot which contains the paging message, or the offset from the beginning of the paging message) | $t\_TX\_1$ $t\_TX\_2, \ldots$ $t\_TX\_K$ |

For Type 2, the base station can hold the BS TX beams in a certain direction to transmit a signal while the MS RX beams are steered to different directions. Then the BS TX can move to another direction while the MS RX beams starts over with the beam steering.

The information of the BS TX beams for Type 2 can include, for example, some or all of the information shown in Table 3. The timing information can have units such as symbols, subframes, frames, and the like.

TABLE 3

Information of BS TX beams for Type 2

| | |
|---|---|
| The number of BS TX beam instances | N |
| The number of signal transmissions during a BS TX beam instance | K |
| The beginning time of a BS TX beam instance (This can alternatively be timing offset from the first beginning time, or offset from the beginning of the paging slot which contains the paging message, or the offset from the beginning of the paging message) | $t\_Ins\_1, t\_Ins\_2, \ldots,$ $t\_Ins\_N$ |
| Within one beam instance, the time duration of each signal transmission for all K signals | $T\_TX\_1, T\_TX\_2, \ldots$ $T\_TX\_K$ |
| If the K signal transmissions are not immediately one after another, then it may also include the beginning time of each signal transmission within one beam instance (the beginning time of the first signal can be omitted if it is the same as the beginning time of a the current BS TX beam instance) (this can alternatively be timing offset from the beginning time of the current BS TX beam instance, timing offset from the first beginning time, or offset from the beginning of the paging slot which contains the paging message, or the offset from the beginning of the paging message) | $t\_TX\_b\_1, t\_TX\_b\_2, \ldots$ $t\_TX\_b\_K$ |

Figure 14:
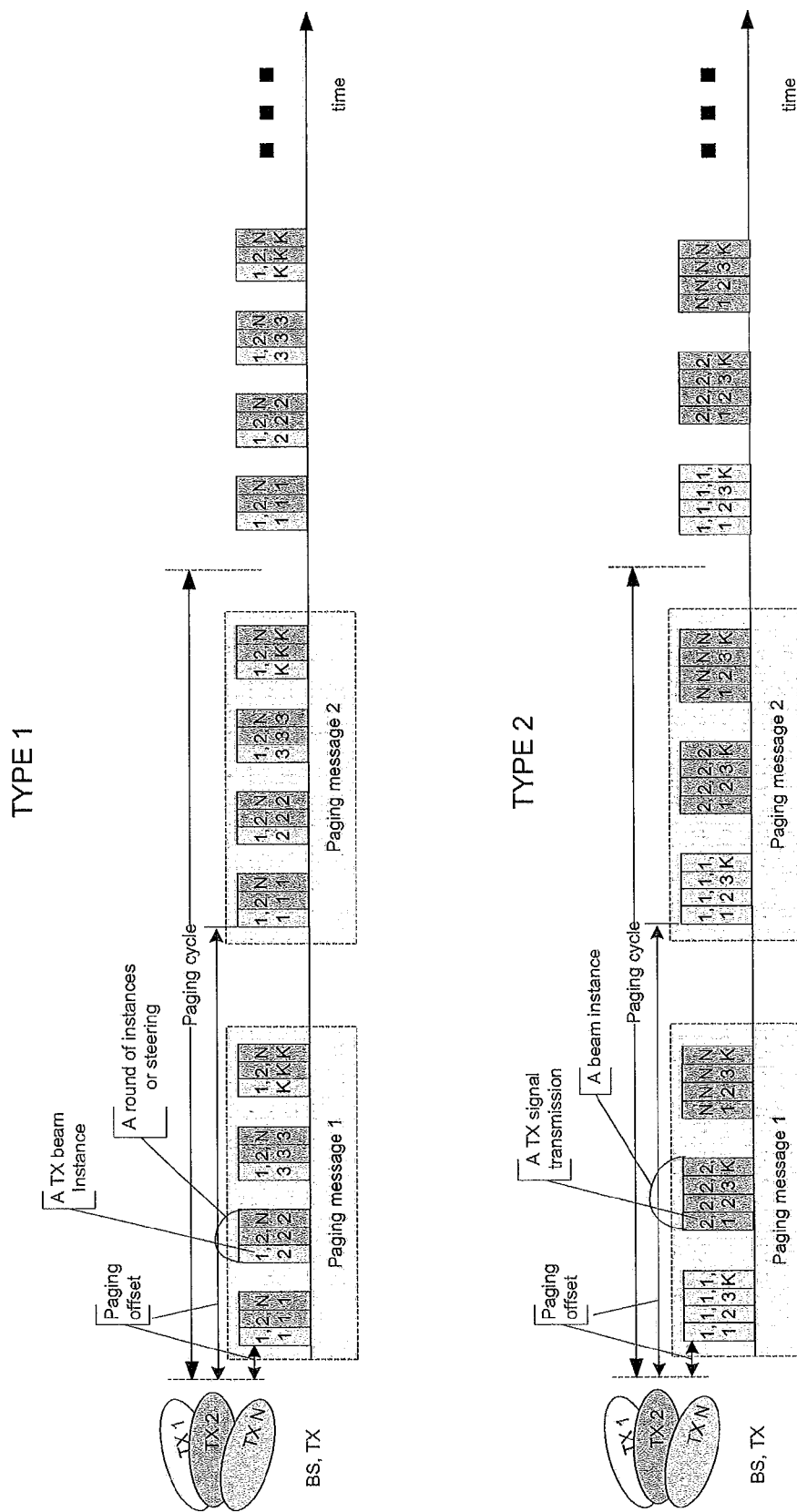
FIG. 14 illustrates some beam related definitions and terms used in embodiments of this disclosure.

FIG. 14 illustrates some beam related definitions and terms used in embodiments of this disclosure. The embodiments illustrated in FIG. 14 are for illustration only. Other embodiments could be used without departing from the scope of this disclosure. Likewise, this disclosure can be applicable to embodiments where different definitions or terms are used.

The timing for the paging message or the timing for the BS to send the paging message can include the timing associated with the paging offset for the paging message, or the offset for the paging slot which contains the paging message or which is for the paging message, the timing for the BS to send the MS the paging information or paging message or portion of a paging message which is related to the MS, along which TX beam instance of the BS, within the paging slot for the paging message, and the like.

The paging offset for the paging message can be a function or a mapping (e.g., hash function) of the number M which can be the number of the MS RX beam instances to use for the MS RX to finish one round of beam steering in the idle mode of the MS, the mobile station identifiers or some sequences derived from mobile station identifiers, and/or other parameters such as base station identifiers, paging cycle, paging area identifiers, base station paging group identifiers, and the like.

For the timing for the BS to send the MS the paging information or paging message or portion of a paging message which is related to the MS within the paging slot for the paging message, the BS may include multiple parameters to define the timing itself, and each parameter can be a certain function of the number M which can be the number of the MS RX beam instances to use for the MS RX to finish one round of beam steering in the idle mode of the MS, the mobile station identifiers or some sequences derived from mobile station identifiers, and/or other parameters such as base station identifiers, paging cycle, paging area identifiers, base station paging group identifiers, and the like.

The following illustrates an example. Assume in one paging cycle, there are P paging offsets (1, . . . , P) and P associated paging slots (1, . . . , P), with each paging slot associated with one paging offset. Each paging slot can be for one paging message. The paging offset can be defined, for example, as described above.

If the number M=1, where M can be the number of MS RX beam instances to use for the MS RX to finish one round of beam steering in idle mode, then the number M does not need to be considered, and the algorithm to calculate the paging/paging-listening offsets may be a function (e.g., a hash function) of the MS identifiers (IDs). For example, the paging offset/slot I (I is the index of the paging slot, or paging message within one paging cycle) for the MS with identifier MS_ID can be calculated as:

$Paging\_Offset\ I = MS\_ID\ modulo\ P.$

Since M of the MS RX beam instances may be used in the idle mode for the MS RX to finish one round of beam steering in idle mode, a new algorithm to calculate the paging timing, which takes into account of the number M, is desired. Assume in one paging cycle, there are P paging offsets (1, . . . , P) and P associated paging slots (1, . . . , P), with each paging slot associated with one paging offset. Each paging slot can be for one paging message. Assume within one paging slot, there are K rounds of paging message instances (1, . . . , K).

Figure 15:
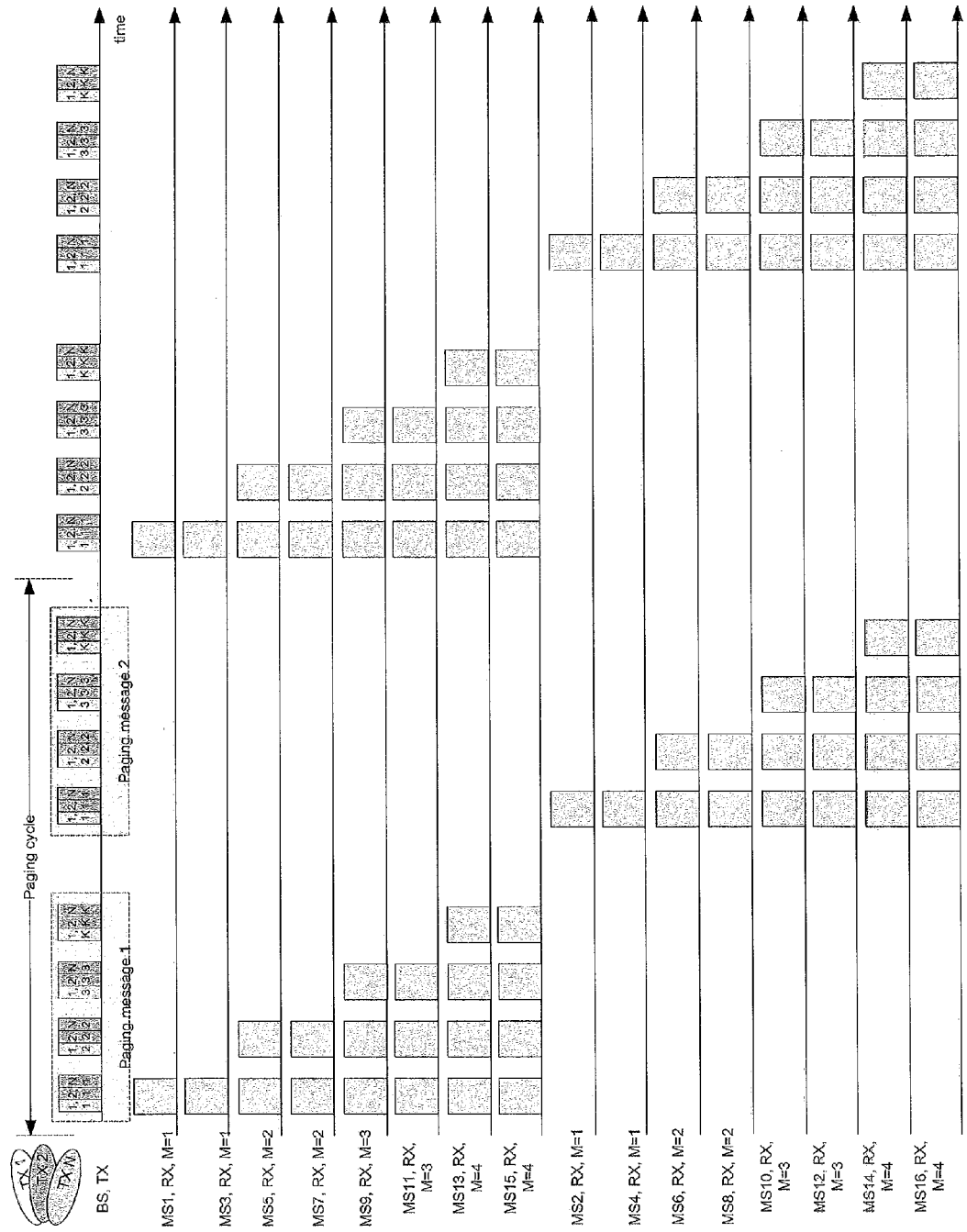
FIGS. 15 through 18 illustrate examples of the paging message and timing determination using a mapping function, according to embodiments of this disclosure.

The paging timing for a MS with an identifier MS_ID and with the number M as the MS RX beam instances to use in the idle mode for the MS RX to finish one round of beam steering in idle mode, can be as follows:

$Paging\_Offset\ I = MS\_ID\ modulo\ P,$ $Paging\_message\_instance\_round\ J=1, \ldots, M, J \leq K.$ FIG. 15 illustrates an example of the paging message and timing determination using a mapping function according to an embodiment of this disclosure. The embodiment illustrated in FIG. 15 is for illustration only. Other embodiments could be used without departing from the scope of this disclosure.

In FIG. 15, the base station steers the TX beams or beam patterns 1, 2, N, where N=3. For a duration of one paging message, the number of rounds of the beam steering is K. In FIG. 15, K=4, however K can vary according to other embodiments. In a paging cycle, there are two paging slots; each slot is for one paging message.

For each MS, if its MSID is an odd number, if there is a paging message for the MS, it is included in the first slot (i.e., paging message 1). If the MSID is an even number, if there is a paging message for the MS, it is included in the second slot (i.e., paging message 2).

The paging message for a MS with number M=1, where M is the number of the MS RX beam instances to use in the idle mode for the MS RX to finish one round of beam steering, is included in the first round of the BS TX beam instances (beam steering) within its paging slot determined by the MSID. The paging message for a MS with number M=x is included in each of the first y=1, 2, ..., x rounds of BS TX beam instances (beam steering), using its y-th RX beam instance, respectively, within its paging slot determined by the MSID. Here, x can be any value in 1, 2, 3, K=4.

If a MS has a number M=1, the MS can monitor the first round of TX beam instances or beam steering within its paging slot determined by the MSID, for the paging message. If the MS has a number M=x, the MS can monitor the first y=1, 2, ..., x rounds of BS TX beam instances or beam steering within its paging slot determined by the MSID, using its y-th RX beam instance, respectively, for the paging message. Here, x can be any value in 1, 2, 3, K=4.

As an alternative, if the MS has a number M=x, the MS can monitor the first y=1, 2, ..., x rounds of BS TX beam instances or beam steering within its paging slot determined by the MSID, for the paging message. Note that the MS may not necessarily use its y-th RX beam instance to receive the y-th round of BS TX beam instance or beam steering; rather, if the MS already has some information on which RX beams are good ones, or which beam pairs (BS TX, MS RX) are good pairs that give good signal strength or good measurement metric value, the MS can use one or more of the good RX beams or beam patterns or beam instances, or one or more of the RX beams or beam patterns or beam instances of the good beam pairs (BS TX, MS RX) to receive the paging message. The MS can then receive the BS TX message at the right timing where its interested message is received, e.g., the MS may only open its RX at the timing for the reception of the BS TX beams or beam patterns or beam instances of the good beam pairs (BS TX, MS RX). Here, x can be any value in 1, 2, 3, K=4. As another alternative, the MS may monitor a subset of the chosen M rounds of BS TX beam instances to monitor.

In such an embodiment, each round of BS TX beam instances (or beam steering) may have a different size of paging message. For example, the first BS TX beam instance (or beam steering) in the first paging slot for paging message 1 can include the paging signal for MSs 1, 3, 5, 7, 9, 11, 13, and 15, while the second BS TX beam instance (or beam steering) in the first paging slot for paging message 1 can include the paging signal for MSs 5, 7, 9, 11, 13, and 15.

A MS with a different number of M can monitor a different number of rounds of the BS TX beam instances or steering. It may only need to monitor those rounds of BS TX beam instances (or beam steering) which include the paging signal to the MS.

Such an embodiment can reduce the overhead of the paging signal or it can reduce the paging message length.

In an embodiment, the paging timing for a MS with an identifier MS_ID and with the number M as the MS RX beam instances to use in the idle mode for the MS RX to finish one round of beam steering in idle mode, can be as follows:

$$\text{Paging\_Offset} = \text{function\_1}(\text{MS\_ID}, N, K, M, \text{etc.}),$$

$$\text{Paging\_message\_instance\_rounds} = \text{function\_2}(\text{MS\_ID}, P, N, K, M, \text{etc.}).$$

In another embodiment, the paging timing for a MS with an identifier MS_ID and with the number M as the MS RX beam instances to use in the idle mode for the MS RX to finish one round of beam steering in idle mode, can be as follows:

$$\text{Paging\_Offset } I = \text{MS\_ID modulo } P,$$

$$\text{Paging\_message\_instance\_round } J = \text{hash}(A,B),$$

where:

$$A = g(\text{MS\_ID}, P), \text{ and}$$

$$B = f(M,K)$$

and where the hash function can be, e.g., a modulo function, a randomization function, or any mapping; A can be a function g of MS_ID and P, and B can be a function of M and K.

For example, we can use modulo as the hash function, and let:

$$A = \text{int}(\text{MS\_ID}/P),$$

$$B = (K \text{ choose } M)$$

where function int(•) takes the integer portion of the value, and B is the number of possible ways to choose M rounds out of K rounds. In this example, the paging timing is as follows:

$$\text{Paging\_Offset } I = \text{MS\_ID modulo } P,$$

$$\text{Paging\_message\_instance\_round } J = (\text{int}(\text{MS\_ID}/P)) \text{ modulo}(K \text{ choose } M).$$

The result J is the index of the (K choose M) choices, and the MS uses the J-th choice out of (K choose M) choices.

An alternative is to have B as follows:

B=the number of possible ways to choose M consecutive rounds out of K rounds.

The paging timing can also be based on a randomization function, as follows:

$$\text{Paging\_message\_instance\_round } J = \text{random\_}f(1 \ldots B)$$

where random_f(B) is a function which randomly chooses a value from the set (1, ..., B).

Another example of a randomization function is as follows:

$$\text{Paging\_message\_instance\_round } J = (\text{random\_num}) \text{ modulo } B$$

where random_num is a random number generated by a certain seed.

For example, random_num can be a random integer number generated by using a certain seed. Both the MS and the network or the BS should use exactly the same random number generation and the same seed.

Figure 16:
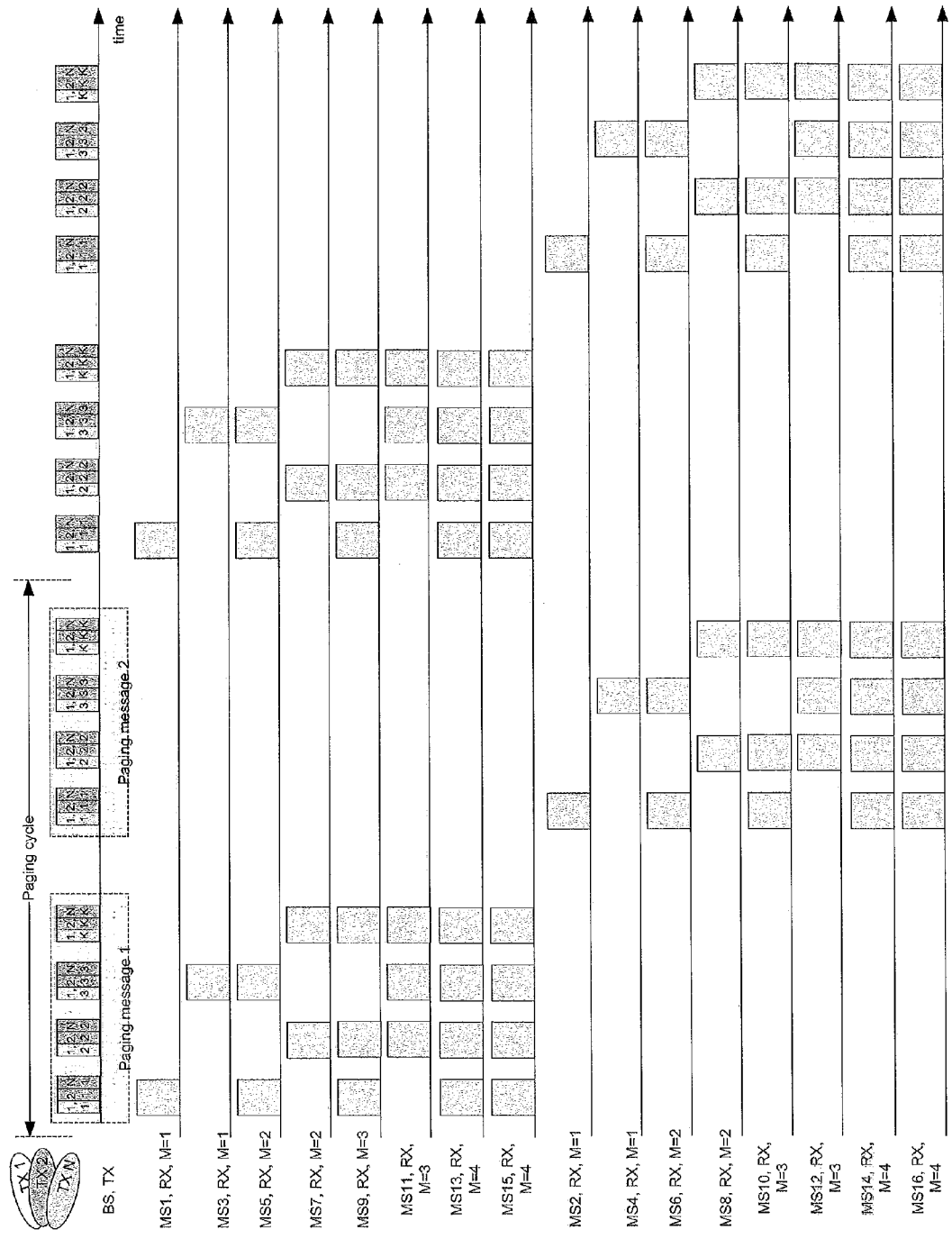

FIG. 16 illustrates another example of the paging message and timing determination using a mapping function according to an embodiment of this disclosure. The embodiment illustrated in FIG. 16 is for illustration only. Other embodiments could be used without departing from the scope of this disclosure.

In FIG. 16, the base station steers the TX beams or beam patterns 1, 2, N, where N=3. For a duration of one paging message, the number of rounds of the beam steering is K. In FIG. 16, K=4, however K can vary according to other embodiments. In a paging cycle, there are two paging slots; each slot is for one paging message.

For each MS, if its MSID is an odd number, if there is a paging message for the MS, it is included in the first slot (i.e., paging message 1). If the MSID is an even number, if there is a paging message for the MS, it is included in the second slot (i.e., paging message 2).

The paging message for a MS with number M=1, where M is the number of the MS RX beam instances to use in the idle mode for the MS RX to finish one round of beam steering, is included in a chosen round (out of the total of 4 rounds) of BS TX beam instances (beam steering) within its paging slot determined by the MSID, where the choice is made by a predefined algorithm. The paging message for a MS with number M is included in each of the chosen M rounds (out of the total of 4 rounds) of BS TX beam instances (beam steering), using its 1, 2, . . . , M-th RX beam instance, respectively, within its paging slot determined by the MSID, where the choice of M rounds is made by a predefined algorithm.

If a MS has a number M, the MS can monitor the chosen M rounds (out of the total of 4 rounds) of BS TX beam instances or beam steering within its paging slot determined by the MSID, using its 1, 2, . . . , M-th RX beam instance, respectively, for the paging message, where the algorithm of the choices of M rounds is the same as the algorithm used in the network or base station.

As an alternative, the MS can monitor the chosen M rounds (out of the total of 4 rounds) of BS TX beam instances or beam steering within its paging slot decided by the MSID. Note that the MS may not necessarily use its 1, 2, . . . , M-th RX beam instance to receive the M rounds of BS TX beam instance or beam steering, respectively; rather, if the MS already has some information on which RX beams are good ones, or which beam pairs (BS TX, MS RX) are good pairs that give good signal strength or good measurement metric value, the MS can use one or more of the good RX beams or beam patterns or beam instances, or one or more of the RX beams or beam patterns or beam instances of the good beam pairs (BS TX, MS RX) to receive the paging message. The MS can then receive the BS TX message at the right timing where its interested message is received; e.g., the MS may only open its RX at the timing for the reception of the BS TX beams or beam patterns or beam instances of the good beam pairs (BS TX, MS RX). As another alternative, the MS may monitor a subset of the chosen M rounds of BS TX beam instances to monitor.

The MS can determine M rounds of BS TX beam instances for the paging message which may carry its interested information, where the algorithm of the choices of M rounds is the same as the algorithm used in the network or base station.

In such an embodiment, each round of BS TX beam instances (or beam steering) may have a balanced size of the paging message. For example, the first BS TX beam instance (or beam steering) in the first paging slot for paging message 1 can include the paging signal for MSs 1, 5, 9, 13, and 15; the second BS TX beam instance (or beam steering) in the first paging slot for paging message 1 can include the paging signal for MSs 7, 9, 11, 13, and 15; and so on. Thus, the length of the paging signal included in each of the round of BS TX beam steering can be substantially balanced.

A MS with a different number of M can monitor a different number of rounds of the BS TX beam instances or beam steering. It may only need to monitor those rounds of BS TX beam instances (or beam steering) which include the paging signal to the MS.

Such an embodiment can reduce the overhead of the paging signal or it can reduce the paging message length, as well as balance the payload in each of the rounds of BS TX beam steering. For example, in FIG. 16, P=2, K=4; for MS3 and MS5, M=2. Thus, there are (4 choose 2)=6 different choices to have two rounds of BS TX beam instances or beam steering, as shown in Table 4.

TABLE 4

| Index | 1 | 2 | 3 | 4 | 5 | 6 |
|---|---|---|---|---|---|---|
| Chosen 2 rounds | (1, 3) | (2, 4) | (1, 4) | (2, 3) | (1, 2) | (3, 4) |

For MS3, int(MS_ID/P)=int(3/2)=1, hence J=1 modulo 6=1, hence, MS3 chooses the first pattern in Table 4, which includes the first and third rounds of BS TX beam steering.

For MS5, int(MS_ID/P)=int(5/2)=2, hence J=2 modulo 6=2, hence, MS5 chooses the second pattern in Table 4, which includes the second and the fourth rounds of BS TX beam steering.

An alternative is to have B as follows:

B=number of possible ways to choose M consecutive rounds out of K rounds.

For example, in FIG. 16, P=2, K=4; for MS3 and MS5, M=2. Thus, there are 3 different choices to have two consecutive rounds of BS TX beam instances or beam steering, hence B=3, as shown in Table 5.

TABLE 5

| Index | 1 | 2 | 3 |
|---|---|---|---|
| Chosen 2 rounds | (1, 2) | (2, 3) | (3, 4) |

The timing for the paging message or the timing for the BS to send the paging message can include the timing associated with the paging offset for the paging message, or the offset for the paging slot which contains the paging message or which is for the paging message, the timing for the BS to send the MS the paging information or paging message or portion of a paging message which is related to the MS, along which TX beam instance of the BS, within the paging slot for the paging message, and the like.

The paging offset for the paging message can be a function or a mapping (e.g., hash function) of the number M which can be the number of the MS RX beam instances to use for the MS RX to finish one round of beam steering in the idle mode of the MS, the mobile station identifiers or some sequences derived from mobile station identifiers, and/or other parameters such as base station identifiers, paging cycle, paging area identifiers, base station paging group identifiers, and the like.

For the timing for the BS to send the MS the paging information or paging message or portion of a paging message which is related to the MS within the paging slot for the paging message, the BS may include multiple parameters to define the timing itself, and each parameter can be a certain function of the number M which can be the number of the MS RX beam instances to use for the MS RX to finish one round of beam steering in the idle mode of the MS, the mobile station identifiers or some sequences derived from mobile station identifiers, and/or other parameters such as base station identifiers, paging cycle, paging area identifiers, base station paging group identifiers, and the like.

The following illustrates an example. Assume in one paging cycle, there are P paging offsets (1, . . . , P) and P associated paging slots (1, . . . , P), with each paging slot associated with one paging offset. Each paging slot can be for one paging message. The paging offset can be defined, for example, as described above.

If the number M=1, where M can be the number of MS RX beam instances to use for the MS RX to finish one round of beam steering in idle mode, then the number M does not need to be considered, and the algorithm to calculate the paging/paging-listening offsets may be a function (e.g., a hash function) of the MS identifiers (IDs). For example, the paging offset/slot I (I is the index of the paging slot, or paging message within one paging cycle) for the MS with identifier MS_ID can be calculated as:

Paging_Offset $I$=MS_ID modulo $P$.

Since M of the MS RX beam instances may be used in the idle mode for the MS RX to finish one round of beam steering in idle mode, a new algorithm to calculate the paging timing, which takes into account of the number M, is desired. Assume in one paging cycle, there are P paging offsets (1, ..., P) and P associated paging slots (1, ..., P), with each paging slot associated with one paging offset. Each paging slot can be for one paging message.

The paging timing for a MS with an identifier MS_ID and with the number M as the MS RX beam instances to use in the idle mode for the MS RX to finish one round of beam steering in idle mode, can be as follows, where Paging_message_signal_transmission L is the set of indices of the signal transmissions within a TX beam instance.

Paging_Offset $I$=MS_ID modulo $P$,

Paging_message_signal_transmission $L$=1, ... $M, L<=K$.

Figure 17:
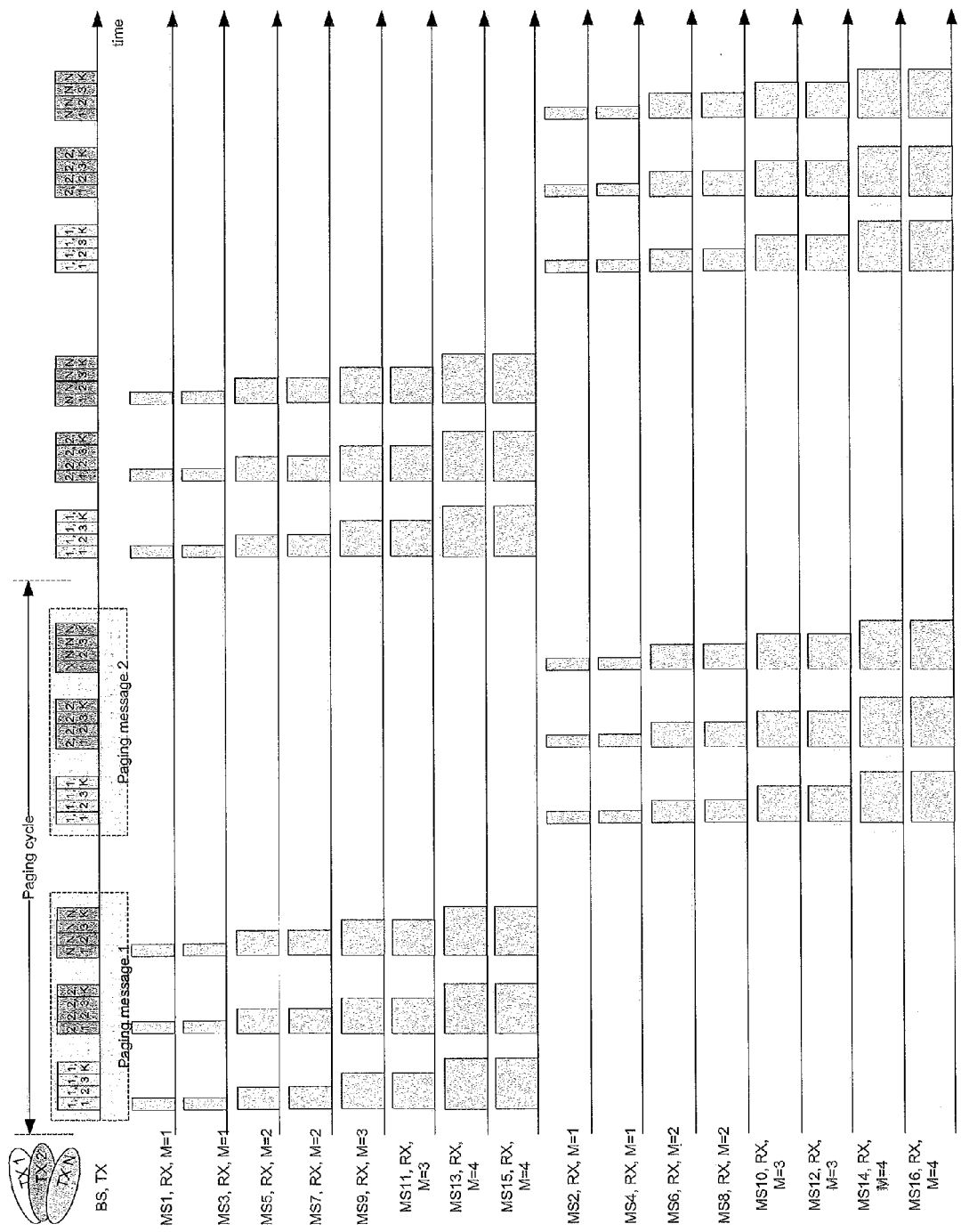

FIG. 17 illustrates yet another example of the paging message and timing determination using a mapping function according to an embodiment of this disclosure. The embodiment illustrated in FIG. 17 is for illustration only. Other embodiments could be used without departing from the scope of this disclosure.

In FIG. 17, for a duration of one paging message, the base station holds its TX beam or beam instance for a certain time, then moves to the second beam or beam instance, until the BS finishes N beam instances, where N=3. In one beam instance, the BS TX sends. K signal transmissions, where the K signals can be the same or different. In a paging cycle, there are two paging slots; each slot is for one paging message.

For each MS, if its MSID is an odd number, if there is a paging message for the MS, it is included in the first slot (i.e., paging message 1). If the MSID is an even number, if there is a paging message for the MS, it is included in the second slot (i.e., the paging message 2).

The paging message for a MS with number M=1, where M is the number of the MS RX beam instances to use in the idle mode for the MS RX to finish one round of beam steering, is included in the first signal transmission within each of the BS TX's N beam instances, within its paging slot determined by the MSID. The paging message for a MS with number M is included in each of the first M signal transmissions (y=1, 2, ..., M) within each of the BS TX's N beam instances, using its M RX beam instances (y=1, 2, ..., M) for these first M signal transmissions from each BS TX beam instance respectively, within its paging slot determined by the MSID. Here, M can be any value in 1, 2, 3, K=4.

If a MS has a number M=1, where M is the number of MS RX beam instances to use in the idle mode for the MS RX to finish one round of beam steering, the MS can monitor the first signal transmission within each of BS TX's N beam instances, within its paging slot decided by the MSID.

If a MS has a number M, the MS can monitor each of the first M signal transmissions (y=1, 2, ..., M) within each of the BS TX's N beam instances, using its M RX beam instances (y=1, 2, ..., M) for these first M signal transmissions from each BS TX beam instance respectively, within its paging slot decided by the MSID. Here, M can be any value in 1, 2, 3, K=4.

As an alternative, the MS can monitor each of the first M signal transmissions (y=1, 2, ..., M) within each of the BS TX's N beam instances, within its paging slot determined by the MSID. Note that the MS may not necessarily use its M RX beam instances (y=1, 2, ..., M) for these first M signal transmissions from each BS TX beam instance respectively; rather, if the MS has already had some information on which RX beams are good ones, or which beam pairs (BS TX, MS RX) are good pairs that give good signal strength or good measurement metric value, the MS can use one or more of the good RX beams or beam patterns or beam instances, or one or more of the RX beams or beam patterns or beam instances of the good beam pairs (BS TX, MS RX) to receive the paging message. The MS can then receive the BS TX message at the right timing where its interested message is received, e.g., the MS may only open its RX at the timing for the reception of the BS TX beams or beam patterns or beam instances of the good beam pairs (BS TX, MS RX). As another alternative, the MS may monitor a subset of the first M signal transmissions of BS TX beam instances to monitor.

In such an embodiment, each signal transmission within the same BS TX beam instance (or beam steering) may have a different size of the paging message. For example, the first signal transmission within the first BS TX beam instance in the first paging slot for the first paging message can include the paging signal for MSs 1, 3, 5, 7, 9, 11, 13, and 15; the second signal transmission within the first BS TX beam instance in the first paging slot for the first paging message can include the paging signal for MSs 5, 7, 9, 11, 13, and 15.

A MS with a different number of M can monitor a different number of signal transmissions within each of the BS TX beam instances. It may only need to monitor these signal transmissions within each of the BS TX beam instances which include the paging signal to the MS.

Such an embodiment can reduce the overhead of the paging signal or it can reduce the paging message length.

In an embodiment, the paging timing for a MS with an identifier MS_ID and with the number M as the MS RX beam instances to use in the idle mode for the MS RX to finish one round of beam steering in idle mode, can be as follows, where paging_message_signal_transmission can be the set of indices or can be the index of the set of the indices of the signal transmissions within a TX beam instance:

Paging_Offset=function_1(MS_ID,$P,N,K,M$,etc.),

Paging_message_signal_transmission=function_2 (MS_ID,$P,N,K,M$,etc.).

In another embodiment, the paging timing for a MS with an identifier MS_ID and with the number M as the MS RX beam instances to use in the idle mode for the MS RX to finish one round of beam steering in idle mode, can be as follows:

Paging_Offset $I$=MS_ID modulo $P$,

Paging_message_signal_transmission $L$=hash($A,B$)

where:

$A$=g(MS_ID,$P$), and $B$=f($M,K$)

and where the hash function can be, e.g., a modulo function, a randomization function, or any mapping; A can be a function g of MS_ID and P, and B can be a function of M and K.

For example, we can use modulo as the hash function, and let:

$A = \text{int}(MS\_ID/P)$, $B = (K \text{ choose } M)$ where function int(•) takes the integer portion of the value, and B is the number of possible ways to choose M rounds out of K rounds. In this example, the paging timing is as follows:

Paging_Offset $I = MS\_ID$ modulo $P$,

Paging_message_instance_round $J = (\text{int}(MS\_ID/P))$ modulo($K$ choose $M$).

The result J is the index of the (K choose M) choices, and the MS uses the J-th choice out of (K choose M) choices.

An alternative is to have B as follows:

B=the number of possible ways to choose M consecutive rounds out of K rounds.

The paging timing can also be based on a randomization function, as follows:

Paging_message_instance_round $J = \text{random}\_f(1 \ldots B)$ where random_f(B) is a function which randomly choose a value from the set (1, . . . , B).

Another example of a randomization function is as follows:

Paging_message_signal_transmission $L = (\text{random\_num}) \text{modulo } B$ where random_num is a random number generated by a certain seed.

For example, random_num can be a random integer number generated by using a certain seed. Both the MS and the network or the BS should use exactly the same random number generation and the same seed.

Figure 18:
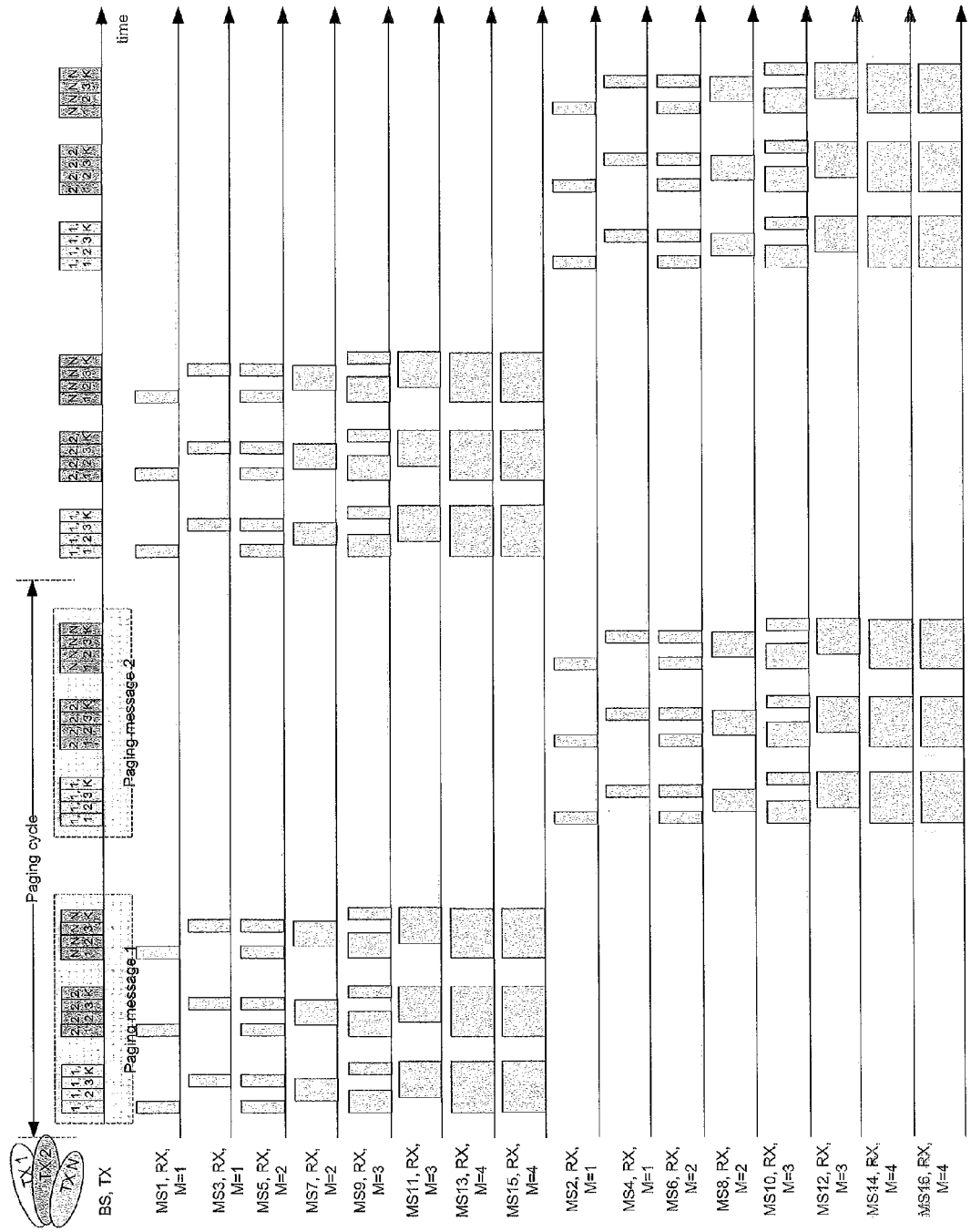

FIG. 18 illustrates still another example of the paging message and timing determination using a mapping function according to an embodiment of this disclosure. The embodiment illustrated in FIG. 18 is for illustration only. Other embodiments could be used without departing from the scope of this disclosure.

In FIG. 18, for a duration of one paging message, the base station holds its TX beam or beam instance for a certain time, then proceeds to the second beam or beam instance, until it finishes N beam instances, where N=3. In one beam instance, the BS TX sends K signal transmissions, where the K signals can be the same or different. In a paging cycle, there are two paging slots; each slot is for one paging message.

For each MS, if its MSID is an odd number, if there is a paging message for the MS, it is included in the first slot (i.e., paging message 1). If the MSID is an even number, if there is a paging message for the MS, it is included in the second slot (i.e., paging message 2).

The paging message for a MS with number M, where M is the number of the MS RX beam instances to use in the idle mode for the MS RX to finish one round of beam steering, is included in each of certain chosen M signal transmissions (y=1, 2, . . . , M) within each of the BS TX's N beam instances, using its M RX beam instances (y=1, 2, . . . , M) for these first M signal transmissions from each BS TX beam instance respectively, within its paging slot determined by the MSID, where the choice of M signal transmissions is made by a predefined algorithm. Here, M can be any value in 1, 2, 3, K=4.

If a MS has a number M, where M is the number of the MS RX beam instances to use in the idle mode for the MS RX to finish one round of beam steering, the MS can monitor each of the certain chosen M signal transmissions (y=1, 2, . . . , M) within each of the BS TX's N beam instances, using its M RX beam instances (y=1, 2, . . . , M) for these first M signal transmissions from each BS TX beam instance respectively, within its paging slot decided by the MSID, where the choice of M signal transmissions is made by the predefined algorithm. Here, M can be any value in 1, 2, 3, K=4.

As an alternative, the MS can monitor each the certain chosen M signal transmissions (y=1, 2, . . . , M) within each of the BS TX's N beam instances, within its paging slot determined by the MSID. Note that the MS may not necessarily use its M RX beam instances (y=1, 2, . . . , M) for these first M signal transmissions from each BS TX beam instance respectively; rather, if the MS already has some information on which RX beams are good ones, or which beam pairs (BS TX, MS RX) are good pairs that give good signal strength or good measurement metric value, the MS can use one or more of the good RX beams or beam patterns or beam instances, or one or more of the RX beams or beam patterns or beam instances of the good beam pairs (BS TX, MS RX) to receive the paging message. The MS can then receive the BS TX message at the right timing where its interested message is received; e.g., the MS may only open its RX at the timing for the reception of the BS TX beams or beam patterns or beam instances of the good beam pairs (BS TX, MS RX). As another alternative, the MS may monitor a subset of the certain chosen M signal transmissions of BS TX beam instances to monitor.

The MS can determine M certain chosen signal transmissions (y=1, 2, . . . , M) within each of the BS TX's N beam instances, for the paging message which may carry its interested information, where the algorithm of the choices of M transmissions is the same as the algorithm used in the network or base station.

In such an embodiment, each signal transmission within the same BS TX beam instance (or beam steering) may have a similar size of the paging message. For example, the first signal transmission within the first BS TX beam instance in the first paging slot for paging message 1 can include the paging signal for MSs 1, 5, 9, 11, 13, and 15; the second signal transmission within the first BS TX beam instance in the first paging slot for paging message 1 can include the paging signal for MSs 7, 9, 11, 13, and 15; and so on.

A MS with a different number of M can monitor a different number of signal transmissions within each of the BS TX beam instances. It may only need to monitor these signal transmissions within each of the BS TX beam instances which include the paging signal to the MS.

Such an embodiment can reduce the overhead of the paging signal or it can reduce the paging message length. Timing can be in units of, e.g., slots, subframes, frames, or superframes.

In an embodiment, when the paging beams or the beams or beam patterns (beam shape, number of beams, beamwidth, beam directions, and the like) for the paging channel are the same as the downlink beams used by the MS in previous steps to receive paging (e.g., the beams for sync channel, beams for BCH, beams for PCFICH (physical control format indicator channel) which indicate the format for PDCCH (physical data control channel), beams for PDCCH which typically gives the data control information such as resource allocation for data, power control information, etc., and other beams), the downlink RX beams can be trained before the paging message is sent (i.e., the MS can know which RX beam(s) are good one(s) to receive the TX beam(s), so the MS can use the already known good RX beams to receive the paging message.

When the UE is in idle mode, and when it is time for the UE to wake up to monitor paging, the UE can come back around to monitor the sync channel of the BS first. From the sync channel, by measurement, the UE can determine what are the good receive beams to receive the downlink signal. The UE can further go to receive broadcast channel information. If the beams for other channels (e.g., beams for PCFICH which indicates format for PDCCH, beams for PDCCH, and the like) are the same (e.g., in terms of beam pattern, beam shape, number of beams, beamwidth, beam directions, and the like) or similar to the beams for the sync channel or primary BCH (PBCH), the UE can use the good RX beams to receive the beams of PCFICH and PDCCH the same as the RX beams to receive the beams for the sync channel or PBCH.

An indication of whether the paging message is transmitted in the subframe, or in the frame, etc., can be transmitted along these same TX beams as the sync channel, PBCH, PCFICH, PDCCH, and the like. The indication can be transmitted explicitly in the payload, or implicitly in the message. For example, the indication can be carried in the sync channel or in PBCH channel, explicitly or implicitly. The indication can also be in the PDCCH, such as a reserved scrambling code for the paging (e.g., a Radio Network Temporary Identifier reserved for paging (P-RNTI), which is used to de-mask the CRC (cyclic redundancy check) of the PDCCH) to scramble the CRC of the PDCCH.

If the paging message is transmitted using the same beam patterns as the ones for the sync channel, PBCH, PCFICH, or PDCCH, etc. (through which the UE already has an idea of which RX beams are good to use to receive the beams), the UE can use the good RX beams to receive the paging message, if the paging indicator detected indicates there is a paging message. Note that reference signals can be in the beams for the sync channel, PBCH, PCFICH, or PDCCH, and the like, so that the MS measurement can be carried out over the reference signals. If the reference signal is not in the beam such as the sync channel, then the measurement can be carried out on the beam signal itself.

For example, in FIGS. 15 and 16, each of MSs 1, 3, 5, 15 can use its RX beam of the best beam pair (BS TX, MS RX) to receive the transmission from the BS TX beam of the best beam pair. Since the BS TX beam of the best pair is already known by the MS, the MS can open up its RX at the exact timing to receive the BS TX beam of the best pair; thus, the MS does not need to open up its RX to receive all the BS TX beams (i.e., the monitoring window of the MS (the bars shown in FIGS. 15 and 16) can be shortened). Also, the MS may not need to use RX beams other than the RX beam in the best beam pair (BS TX, MS RX). In addition, the number K in the figures may not need to be greater than the maximum number of M among the MSs. K can be independent of M. The minimum value of K is one.

In the embodiments shown in FIGS. 15 and 16, each of the RX beams in the best beam pair (BS TX, MS RX) can have the same number of K chances to get the paging message that relates to the MS. For example, MS1 has 3 chances, MS 7 also has 3 chances, and so on. In other embodiments, multiple MS RX beam instances can be used to receive the message that the MS is interested in, rather than the one best MS RX beam. The MS may use soft decoding to soft combining to decode the information it needs. Note that the best beam pair (BS TX, MS RX) can be based on a metric such as signal strength, signal to noise ratio, RSRP (reference signal received power), RSRQ (reference signal received quality), signal to interference ratio, and the like.

For example, in FIGS. 17 and 18, each of MSs 1, 3, 5, . . . , 15 can use its RX beam of the best beam pair (BS TX, MS RX) to receive the transmission from the BS TX beam of the best beam pair. Since the BS TX beam of the best pair has already known by the MS, the MS can open up its RX at the exact timing to receive the BS TX beam of the best pair, and the MS does not need to open up its RX to receive all the BS TX beams (i.e., only the MS RX bars right below the BS TX of the said pair will show in the figure, and the other MS RX bars below the BS TX other than the BS TX of the said pair are not needed). In addition, the number K in FIGS. 17 and 18 may not need to be greater than the maximum number of M among the MSs. K can be independent of M. The minimum value of K is one.

In the embodiments shown in FIGS. 17 and 18, each of the RX beam in the best beam pair (BS TX, MS RX) can have the same number of K chances to get the paging message that relates to the MS. For example, MS1 has 3 chances, MS 7 also has 3 chances, and so on. In other embodiments, multiple MS RX beam instances can be used to receive the message that the MS is interested in, rather than the one best MS RX beam. The MS may use soft decoding to soft combining to decode the information it needs.

In an embodiment, the beam patterns (beam shape, number of beams, beamwidth, beam directions, and the like) for the paging message can be the same as the downlink beam patterns used by the MS in previous steps to receive paging message. For example, the beam patterns for the paging message can be the same as the downlink beam patterns of the beams which carry the information of the paging indicator, which indicates whether the paging message is included in the current subframe, frame, etc.

FIGS. 19A through 19D illustrate some examples according to embodiments of this disclosure. The embodiments illustrated in FIGS. 19A through 19D are for illustration only. Other embodiments could be used without departing from the scope of this disclosure.

Figure 19A:
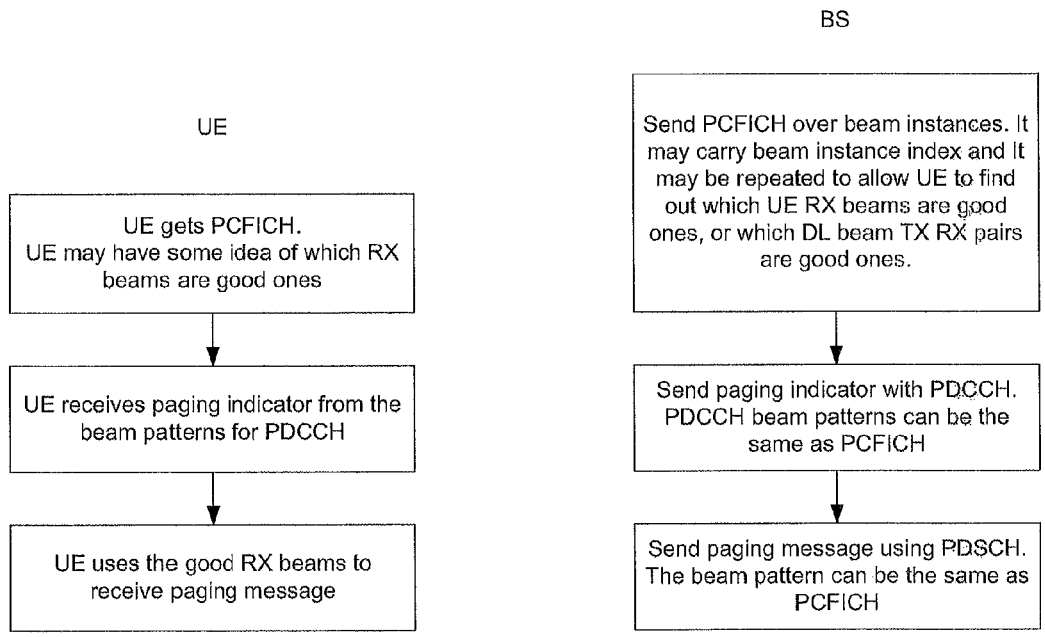
FIGS. 19A through 19D illustrate examples of using beams sent in prior steps to train user equipment (UE) receiving beams, according to embodiments of this disclosure.
Figure 19B:
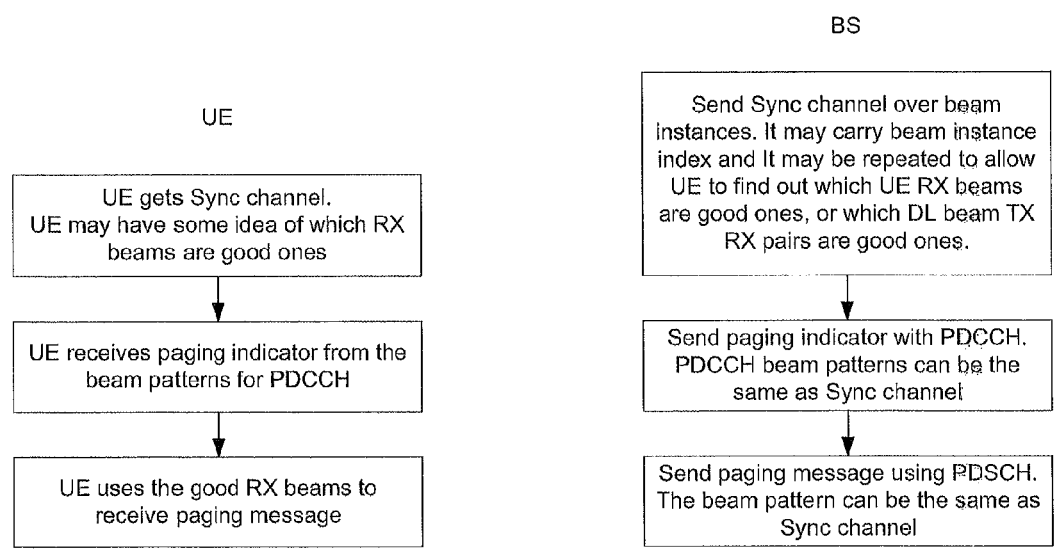
Figure 19C:
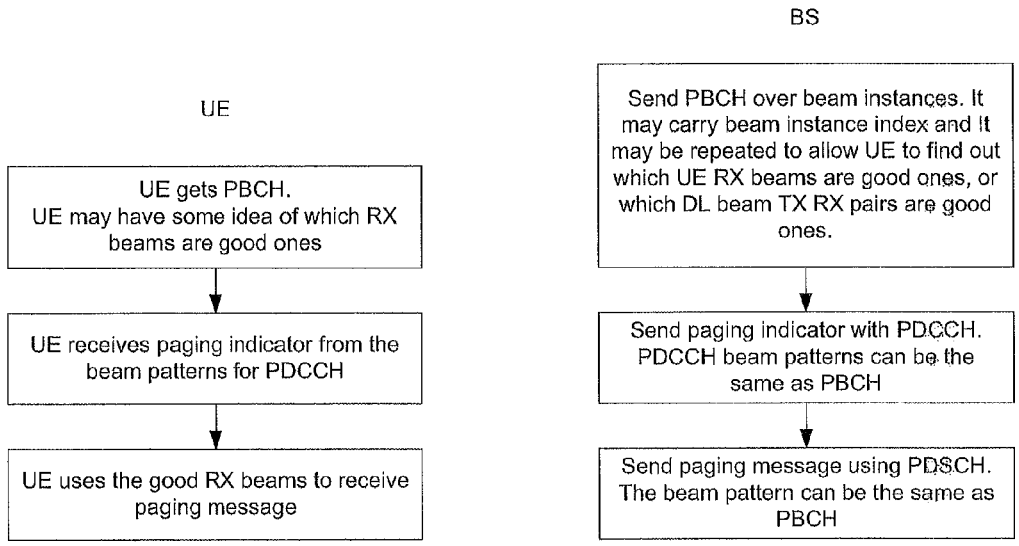
Figure 19D:
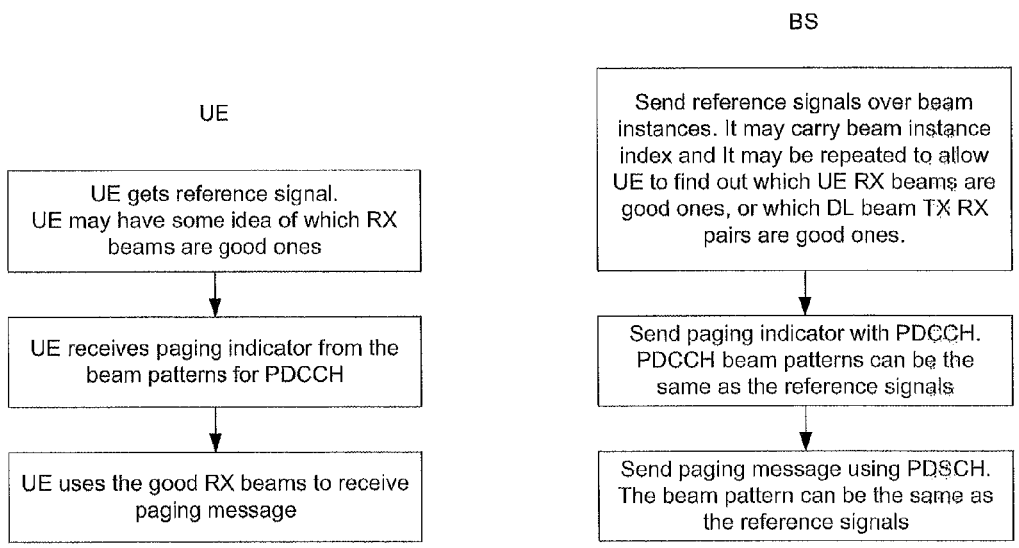

In FIGS. 19A-19D, a UE uses beams sent in prior steps to obtain the paging message to train the UE RX beams. The paging message uses the same beam patterns as some beams in some prior steps, so that the UE can use the good RX beams to receive paging message. In FIG. 19A, the UE uses a PCFICH beam to train the UE RX beams. The paging message uses the same beam pattern as the PCFICH. In FIG. 19B, the UE uses a sync channel beam to train the UE RX beams. The paging message uses the same beam pattern as the sync channel. In FIG. 19C, the UE uses a PBCH (primary broadcast channel, or master information block (MIB)) beam to train the UE RX beams. The paging message uses the same beam pattern as the PBCH. In FIG. 19D, the UE uses a reference signal to train the UE RX beams. The paging message uses the same beam pattern as the reference signal.

A UE may use one or more of the following steps to get the paging message: obtaining sync channel, PBCH, PCFICH, PDCCH (which can carry the indicator whether the paging message exists, and the resource location for paging message), and PDSCH (which carry the paging message, or the paging channel containing the paging message).

As shown in FIG. 19A, when the UE wakes up from the idle mode to monitor paging, it may skip the sync channel and the PBCH, and go directly to the PCFICH. If the PCFICH also carries a beam index, and also repeats to allow the UE to determine which UE RX beams are good ones, or which DL beam TX and RX pairs are good ones, the UE can learn which RX beams are good ones to use to receive the follow up information on the PDCCH and PDSCH. The PDCCH carrying the paging indicator can use the same beam patterns as the PCFICH (although it may not need to be repeated for UE RX beam training purposes). Then, if the paging indicator indicates that the paging message is received, the UE goes to the paging message's place to get the paging message. Similar scenarios are shown in FIGS. 19B-19D for the sync channel, PBCH channel, and reference signals.

In an embodiment, the beam for the PDCCH can also carry a signal together with PDCCH or PCFICH. The signal is used for beam training purposes by the MS to determine the good RX beams or good (BS TX, MS RX) beam pairs. The signal can be, e.g., a reference signal, a cell specific reference signal, and the like.

Some channels, such as the sync channel, PBCH, PCFICH, PDCCH, reference signal, cell specific reference signal, reference signal over beams, etc., can be designed in a way that they are repeated over beam instances; the beams can carry indices or indicators such that the MS can determine the good RX beams or good (BS TX, MS RX) beam pairs. When the MS returns from DRx mode, even in connected mode, the MS can go to the places where it can get the downlink beam training, such as the Sync channel, PBCH, PCFICH, PDCCH, reference signal, cell specific reference signal, reference signal over beams, and the like.

In an embodiment, when the paging beams or the beams or beam patterns (beam shape, number of beams, beamwidth, beam directions, etc.) for the paging channel are different from the downlink beams in previous steps for the MS to receive paging (e.g., the beams for the sync channel, beams for BCH, beams for PCFICH which indicates format for PDCCH, or beams for PDCCH), the downlink RX beams may not be trained before the paging message is sent (i.e., the MS can know which RX beam(s) are good one(s) to receive the TX beam(s), so the MS may use all of the RX beams to receive the paging message. The number K may need to be greater than the maximum number of M among all MSs.

The paging methods described in this disclosure can also be used for other purposes, such as for updates of system information, or for some system calls to the MS in certain situations such as an earthquake, emergency, and the like. Some other reserved scrambling codes for PDCCH may be used. However, the message that the MS may need (e.g., the new system information, the paging message for an earthquake or emergency or public safety, etc.) can use the same beams or beam patterns as the PDCCH or other channels which carry the information of the paging indicator, or the indicator which indicates whether the paging message exists, whether the system information is updated, or whether the message for earthquake, public safety, etc. exists in the subframe or frame, etc.

In an embodiment, the UE in the idle mode can monitor the PDCCH at the timings set by the DRx parameters, to check whether the scrambling code reserved for paging (e.g., the P-RNTI, which is used to de-mask the CRC of PDCCH) can be detected. The PDCCH can be used to train the UE's Rx beam. The paging message should be sent over the same beam as the PDCCH beam. Then the UE will use its good Rx beam(s) to receive the paging message.

In another approach, the paging indication can be sent over the beams as the SCH or BCH. Then the UE will be trained on the Rx beam. The paging message should be sent over the same beam as the SCH or BCH. The shared channel, PDSCH, can be the same Tx beam configuration for paging message and for SIBs, for example. If a paging message is delivered over beams not yet trained for the UE's Rx, additional training is needed.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for paging configuration by a mobile station in a wireless network, the method comprising:
   transmitting, by the mobile station, a parameter M representing a number of receiving (RX) beam instances at the mobile station in idle mode for the mobile station to finish one round of beam steering;
   determining, by the mobile station, a timing for receiving a paging message from a base station, the timing being a function of the parameter M, the paging message comprising a mobile station identifier; and
   receiving, by the mobile station, the paging message from the base station based on the determined timing.

2. The method of claim 1, wherein the function comprises at least one of: a hashing function and a randomization function.

3. The method of claim 1, wherein the function is configured such that lengths of a plurality of paging signals transmitted by the base station in each round of base station transmitter steering are substantially balanced.

4. The method of claim 1, wherein the timing for receiving the paging message is also a function of at least one of: parameters related to transmitting beams of the base station, and the mobile station identifier.

5. The method of claim 1, wherein the parameter M is transmitted to the base station when the mobile station is in initial network entry, when the mobile station is in network reentry, before the mobile station enters the idle state, or when the mobile station is performing a location update.

6. An apparatus for use in a mobile station configured to receive paging messages in a wireless network, the apparatus comprising:
   at least one antenna; and
   a processor coupled to the at least one antenna, the processor configured to:
      transmit, a parameter M, by the mobile station, representing a number of receiving (RX) beam instances at the mobile station in idle mode for the mobile station to finish one round of beam steering;
      determine a timing for receiving a paging message from the base station, the timing is determined as a function of the parameter M, the paging message comprising a mobile station identifier; and
      receive the paging message from the base station based on the determined timing.

7. The apparatus of claim 6, wherein the function comprises at least one of: a hashing function and a randomization function.

8. The apparatus of claim 6, wherein the function is configured such that lengths of a plurality of paging signals transmitted by the base station in each round of base station transmitter beam steering are substantially balanced.

9. The apparatus of claim 6, wherein the timing for receiving the paging message is also a function of at least one of: parameters related to transmitting beams of the base station, and the mobile station identifier.

10. The apparatus of claim 6, wherein the processor transmits the parameter M to the base station when the mobile station is in initial network entry, when the mobile station is in network reentry, before the mobile station enters the idle state, or when the mobile station is performing a location update.

11. A method for paging configuration by a base station in a wireless network, the method comprising:
- receiving, at the base station, a parameter M representing a number of receiving (RX) beam instances at a mobile station in idle mode for the mobile station to finish one round of beam steering;
- determining, at the base station, a timing for transmitting a paging message to the mobile station, the timing being a function of the parameter M, the paging message comprising a mobile station identifier; and
- transmitting, at the base station, the paging message to the mobile station based on the determined timing.

12. The method of claim 11, wherein the function comprises at least one of: a hashing function and a randomization function.

13. The method of claim 11, wherein the function is configured such that lengths of a plurality of paging signals transmitted by the base station in each round of base station transmitter beam steering are substantially balanced.

14. The method of claim 11, wherein the timing for transmitting the paging message is also a function of at least one of: parameters related to transmitting beams of the base station, and the mobile station identifier.

15. The method of claim 11, wherein the parameter M is received from the mobile station when the mobile station is in initial network entry, when the mobile station is in network reentry, before the mobile station enters the idle state, or when the mobile station is performing a location update.

16. An apparatus for use in a base station configured to transmit paging messages in a wireless network, the apparatus comprising:
- at least one antenna; and
- a processor coupled to the at least one antenna, the processor configured to:
  - receive a parameter M, at the base station, representing a number of receiving (RX) beam instances at the mobile station in idle mode for the mobile station to finish one round of beam steering;
  - determine, at the base station, a timing for transmitting a paging message to the mobile station, the timing is determined as a function of the parameter M, the paging message comprising a mobile station identifier; and
  - transmit, at the base station, the paging message to the mobile station based on the determined timing.

17. The apparatus of claim 16, wherein the function comprises at least one of: a hashing function and a randomization function.

18. The apparatus of claim 16, wherein the function is configured such that lengths of a plurality of paging signals transmitted by the base station in each round of base station transmitter beam steering are substantially balanced.

19. The apparatus of claim 16, wherein the timing for transmitting the paging message is also a function of at least one of: parameters related to transmitting beams of the base station, and the mobile station identifier.

20. The apparatus of claim 16, wherein the processor receives the parameter M from the mobile station when the mobile station is in initial network entry, when the mobile station is in network reentry, before the mobile station enters the idle state, or when the mobile station is performing a location update.

* * * * *